(12) United States Patent
Rajarajan et al.

(10) Patent No.: US 7,196,712 B2
(45) Date of Patent: Mar. 27, 2007

(54) DYNAMIC, LIVE SURFACE AND MODEL ELEMENTS FOR VISUALIZATION AND MODELING

(75) Inventors: Vij Rajarajan, Redmond, WA (US); Casey L. Kiernan, Kirkland, WA (US); Stewart P. MacLeod, Woodinville, WA (US); Shawn E. Oberst, Maple Valley, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 10/945,005

(22) Filed: Sep. 20, 2004

(65) Prior Publication Data

US 2005/0041042 A1    Feb. 24, 2005

Related U.S. Application Data

(63) Continuation of application No. 09/742,819, filed on Dec. 20, 2000, now Pat. No. 6,795,089.

(51) Int. Cl.
*G09G 5/00* (2006.01)

(52) U.S. Cl. .................................................... 345/619

(58) Field of Classification Search ................ 345/419, 345/629, 630, 632, 633, 619; 715/500, 502, 715/513, 516, 514, 517, 760
See application file for complete search history.

(56) References Cited

U.S. PATENT DOCUMENTS

| | | | |
|---|---|---|---|
| 5,130,932 A | 7/1992 | Kaihara et al. | |
| 5,838,973 A | 11/1998 | Carpenter-Smith et al. | 395/701 |
| 5,907,704 A | 5/1999 | Gudmundson et al. | |
| 5,956,023 A | 9/1999 | Lyle et al. | |
| 5,958,012 A | 9/1999 | Battat et al. | |
| 5,983,218 A | 11/1999 | Syeda-Mahmood | |
| 6,041,143 A | 3/2000 | Chui et al. | |
| 6,054,987 A | 4/2000 | Richardson | 345/348 |
| 6,069,634 A | 5/2000 | Gibson | |

(Continued)

OTHER PUBLICATIONS

Microsoft Computer Dictionary Fifth Edition. Copyright 2002. p. 757.
Khriss et al., "Automating the Synthesis of UML State Chart Diagrams from Multiple Collaboration Diagrams," *The Unified Modeling Language, UIML '98:Beyond the Notation, First International Workshop*, pp. 132-147 (Jun. 3-4, 1998).

(Continued)

*Primary Examiner*—Kimbinh T. Nguyen
(74) *Attorney, Agent, or Firm*—Microsoft Corporation

(57) ABSTRACT

Described is a method and system providing a dynamic, live (active) surface and/or model elements to complement and enhance what is being modeled or visualized, enabling the addition of new features and functionality to visualization and modeling tools. A dynamic surface is accomplished by extending traditional HTML, rendering APIs and/or components to enable visualization and modeling functionality. The surface background and model elements may comprise HTML elements, and the surface can include a Web site. The model elements are HTML elements layered dynamically atop the surface, as the user interacts with them, and completed designs may be saved in a non-proprietary format, (e.g., HTML). The live surface bases its services on HTML rendering engine services, and further provides a visualization and modeling engine that wraps and extends the rendering engine through multiple interfaces. Interfaces can enumerate modeling elements and their relationships, add, delete or change connections between model elements and states, and initialize the surface, including loading an existing diagram such as saved as an HTML document.

40 Claims, 9 Drawing Sheets

U.S. PATENT DOCUMENTS

| | | |
|---|---|---|
| 6,233,537 B1 | 5/2001 | Gryphon et al. |
| 6,343,377 B1 | 1/2002 | Gessner et al. |
| 6,353,448 B1 | 3/2002 | Scarborough et al. |
| 6,363,404 B1 | 3/2002 | Dalal et al. |
| 6,384,843 B1 | 5/2002 | Harel |
| 6,418,421 B1 | 7/2002 | Hurtado et al. |
| 6,425,120 B1 | 7/2002 | Morgnaelli et al. |
| 6,430,538 B1 | 8/2002 | Bacon et al. |
| 6,448,968 B1 | 9/2002 | Pfister et al. |
| 6,499,035 B1 | 12/2002 | Sobieski |
| 6,515,656 B1 | 2/2003 | Wittenburg et al. |
| 6,535,912 B1 | 3/2003 | Anupam et al. ............ 709/217 |
| 6,611,725 B1 | 8/2003 | Harrison et al. |

OTHER PUBLICATIONS

Paech B., "On the Role of Activity Diagrams in UML—A User Task Centered Development Process for UML," *The Unified Modeling Language, UML '98: Beyond the Notation, First International Workshop*, pp. 267-277 (Jun. 3-4, 1998).

Quatrani, "Visual Modeling with Rational Rose and UML", Addison Wesley, $3^{rd}$ Printing, Apr. 1998.

Andersson et al., "Interactive Techniques for Visual Design," *Topics in Surface Modeling*, Chapter 6, American Mathematical Society, pp. 95-113 (1992).

Blake, Jeffrey, "Software Through Pictures vs. Paradigm Plus," *Advanced Systems Magazine*, pp. 84-88 (Jun. 1994).

DYNAMIC, LIVE SURFACE AND MODEL ELEMENTS FOR VISUALIZATION AND MODELING

CROSS-REFERENCE TO RELATED APPLICATION

This application is a continuation of U.S. patent application Ser. No. 09/742,819, filed Dec. 20, 2000, and issued as U.S. Pat. No. 6,795,089 on Sep. 21, 2004.

FIELD OF THE INVENTION

The present invention is generally directed to computer systems, and more particularly to visualization and modeling in computer systems.

BACKGROUND OF THE INVENTION

Visualization and modeling software is extensively used in industry. Visualization generally refers to computer tools for viewing existing layouts, such as for viewing a representation of a network topology, an electrical wiring system or various other things that are designed. Visualization has general relevance in various applications, e.g., viewing a network topology is a scenario that is applicable to many different products. Modeling refers to computer tools used to design things, such as software, databases, integrated circuits, CAD/CAM applications and the like. Thus, in general, in visualization, a user looks at interconnected model elements placed on a viewing surface. In modeling, a user places the model elements on a work surface and connects them together in some manner. The semantics of connecting two or more model elements using other model elements is the fundamental operation in modeling and visualization.

However, existing visualization and modeling tools have a number of drawbacks, including that the developers of the tools have made them closed and proprietary. For example, the rules and semantics of connecting two or more model elements together are embedded in the modeling tool, e.g., an integrated circuit design tool will allow or disallow a connection between two elements based on some hard-coded knowledge about those elements. As a consequence, the tool that has the hard-coded rules and semantics, and the model elements, typically come from the same vendor, or at least come from sources having detailed knowledge of one another, resulting in a closed and proprietary tool in which independent software vendors (ISVs) or other third parties cannot participate. Moreover, existing tools are essentially not extensible, but rather require a newer version from the vendor each time updates (e.g., to modify the hard-coded rules or semantics) are required.

Further, existing modeling and visualization products use a static work surface that is essentially a display of a given area of a layout, along with static model elements. For example, when modeling, a user simply drops static modeling elements onto a static surface, or works with the tool to connect such elements together on the surface.

Moreover, because existing visualization and modeling tools are closed and proprietary, the file formats that store the designs are proprietary. As a result, another drawback with these existing tools is that they work with data in their own proprietary file formats, and thus there is no interoperability between various tools.

SUMMARY OF THE INVENTION

Briefly, the present invention provides a dynamic, live surface and/or model elements to complement and enhance what is being modeled or visualized, enabling the addition of new features and functionality to visualization and modeling tools. Moreover, completed designs may be saved in a non-proprietary format, such as HTML (HyperText Markup Language). To this end, the surface comprises an object such as an ActiveX® control having defined interfaces, properties and methods. Among other functions, the surface raises and responds to events. The model elements are also objects having interfaces, properties and methods, and also raise and respond to events.

In one implementation, a dynamic surface is accomplished by extending traditional HTML or the rendering APIs and components to enable visualization and modeling functionality. The surface background, and the model elements thus may be HTML elements, and, for example, the surface can comprise a Web site accessible by a URL. The model elements are HTML elements layered on top of the surface dynamically, as the user interacts with them. When the user is done using the tool, the state of the diagram may be saved as standard HTML. More particularly, in this implementation, the live surface bases its services on the HTML services in an HTML rendering engine, and further provides a visualization and modeling engine (VME) that wraps and extends the rendering engine through multiple interfaces. Such interfaces include interfaces to enumerate the modeling elements (e.g., nodes and arcs) and their relationships, to add, delete or change node/arc connections, and to initialize the VME surface, including loading an existing diagram or initializing a new diagram. VME services are available as an extension to the rendering engine object model for programming from within the HTML page, and also from the tool/shell hosting VME. These and many other interfaces provide numerous capabilities unavailable with a static surface.

By way of example, a URL (Uniform Resource Locator) can be specified to act as the background or the starting point for a new diagram. Thus, a live HTML page of the United States weather map can be used as a surface for visualizing a topology of network servers across the country. A live surface is also useful when designing a database schema, wherein having a dynamic surface enables the use of a background HTML page which walks the user through the steps as the user creates the schema, e.g., the background content changes in response to user actions, dynamically providing help and/or correcting users as they make mistakes. The dynamic surface and model elements can also be used to link external sources of information or related visualization/modeling diagrams. Collaborative modeling is also possible via the live surface and model elements.

Other advantages will become apparent from the following detailed description when taken in conjunction with the drawings, in which:

DETAILED DESCRIPTION OF THE PREFERRED EMBODIMENT

Exemplary Operating Environment

Figure 1:
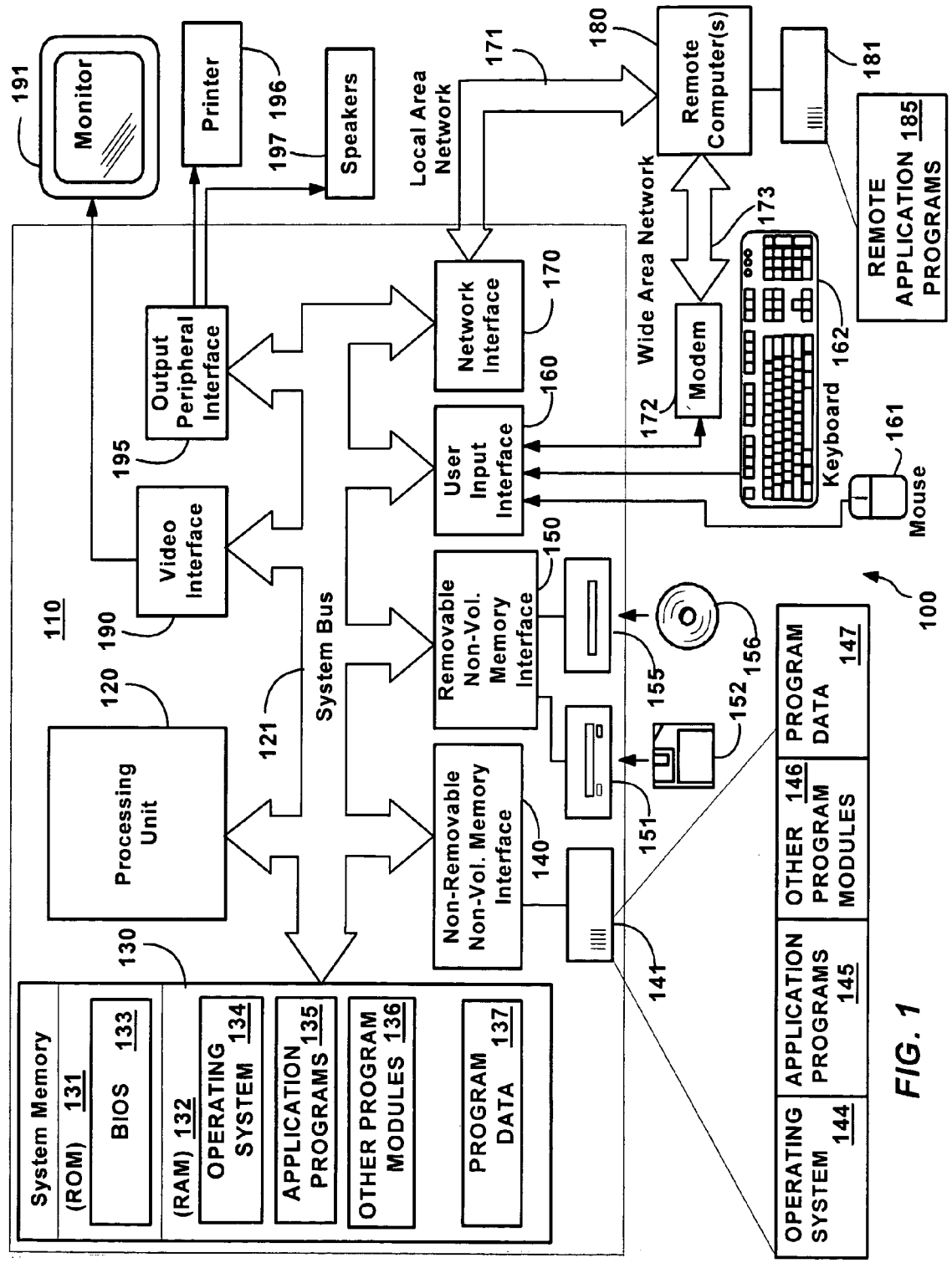
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Visual Modeling Framework

Figure 2:
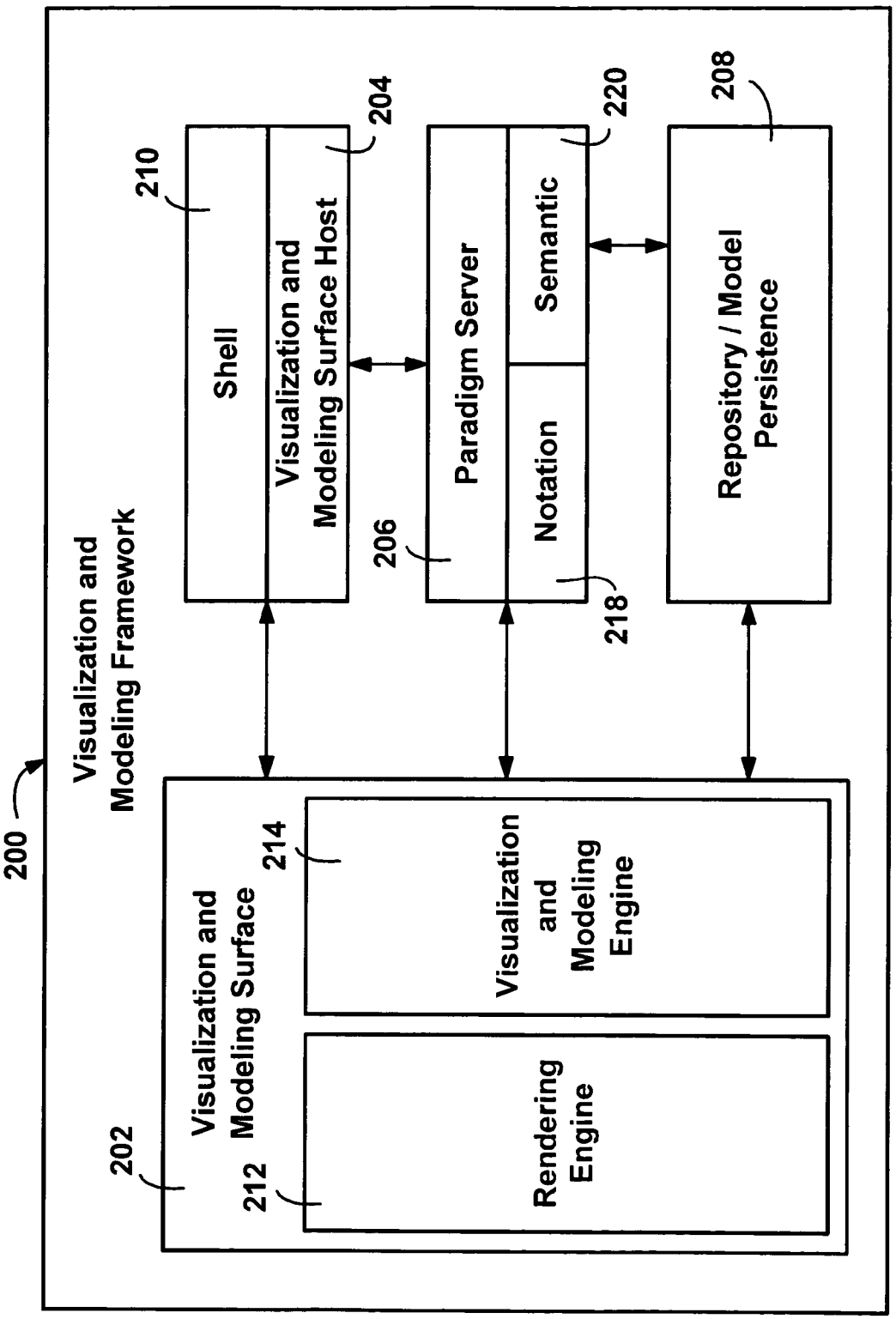
FIG. 2 is a block diagram generally representing a visualization and modeling framework (VMF) in which a live surface and model elements are provided in accordance with an aspect of the present invention.
Figure 3:
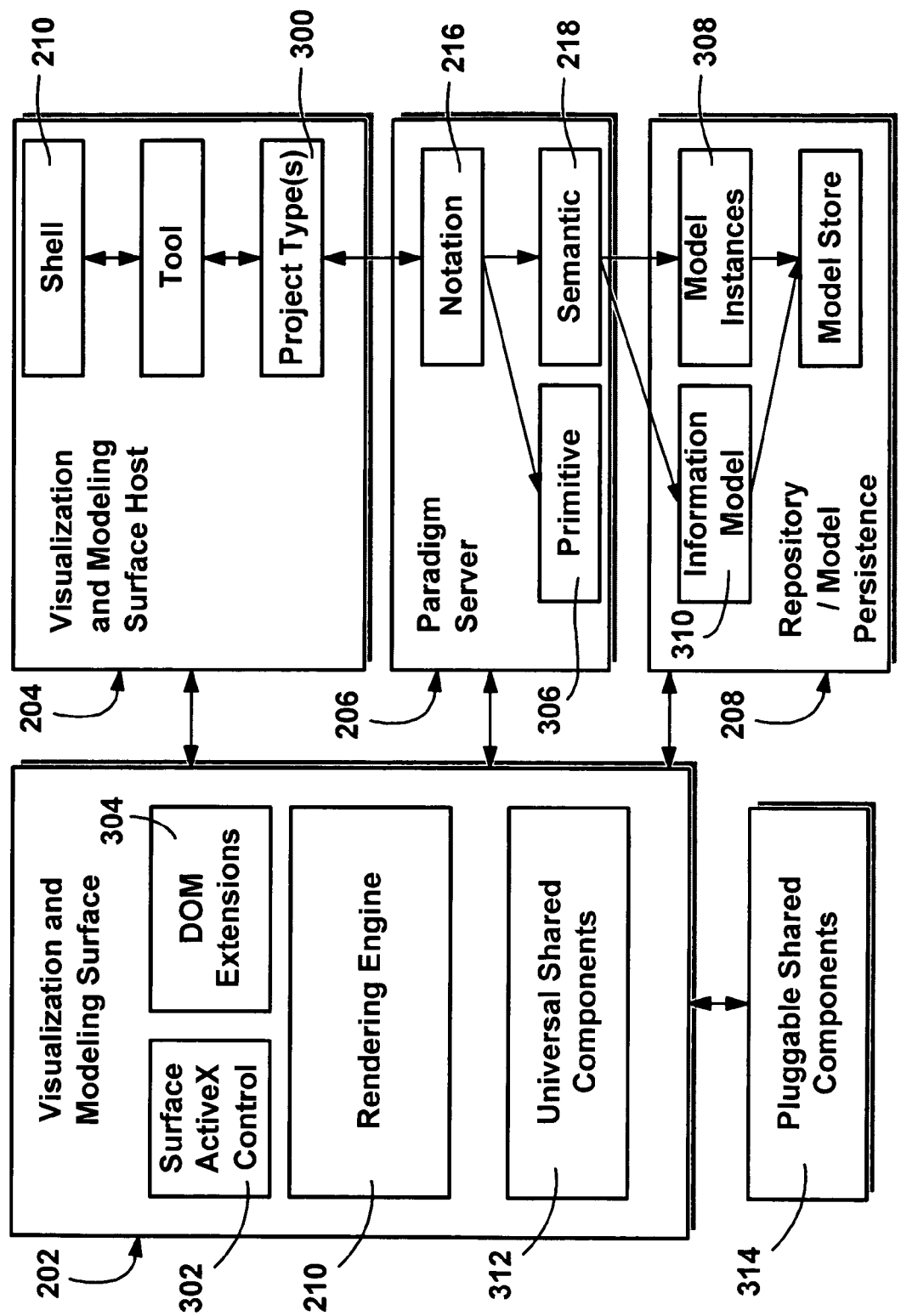
FIG. 3 is a block diagram generally representing exemplary components in the VMF including a live surface and model elements in accordance with an aspect of the present invention.
Figure 4:
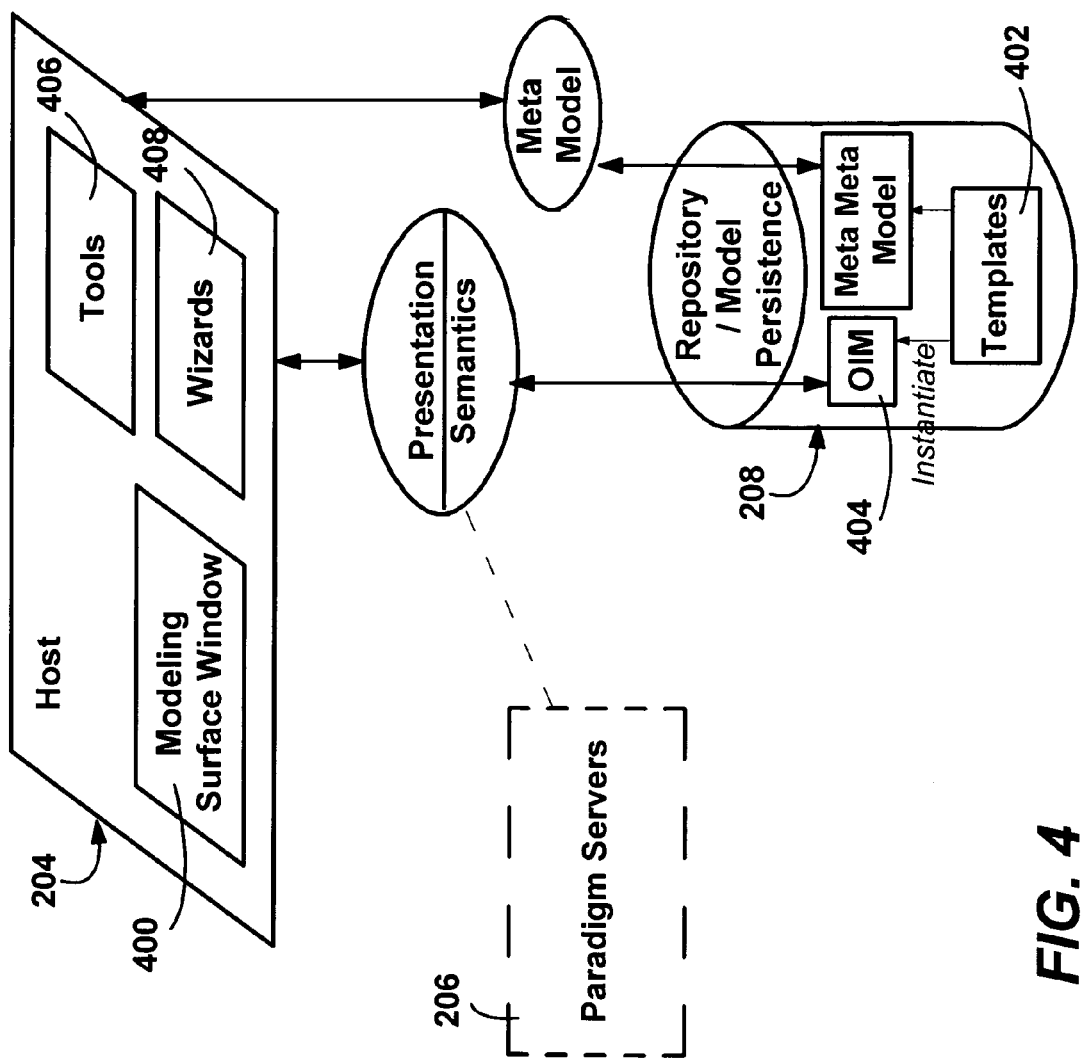
FIG. 4 is a block diagram generally representing a physical architecture of the VMF in accordance with an aspect of the present invention.

As generally represented in FIGS. 2–4, the Visualization and Modeling Framework (VMF) is a component-based framework 200 for visualization and modeling tools. VMF is a general-purpose modeling tool having a paradigm-independent surface 202 capable of modeling numerous kinds of model elements. Nevertheless, unlike other diagramming tools, VMF is still capable of enforcing model semantics and constraints.

A minimum VMF architecture requires the surface 202, a host 204 and a paradigm server 206. Model persistence, such as in the form of a repository 208, is optional, but is very likely in many modeling scenarios, for example, to maintain properties and other information for model elements. In keeping with the present invention as described below, the VMF components such as the surface 202, core graphic components and other components are designed to be reusable across modeling paradigms. For example, new model elements may be introduced by registering new paradigm servers (e.g., ActiveX® controls). Similarly, new project types may be introduced, (e.g., as ActiveX® servers). Some or all of the components that comprise the VMF 200 may be incorporated into an operating system, such as the operating system 135 (FIG. 1) of the computer 110.

The VMS host 204 is a tool that uses the services of the VMF 200 to solve a problem for the end user. In one straightforward situation, this tool may be a stand-alone executable program, wizard or add-in, with a specific problem domain for which it will provide solutions. For example, a simple host can be just a tool that hosts the surface 202 and a known paradigm server 206, e.g., a type-modeling tool may be created that utilizes a Unified Modeling Language (UML) paradigm server to model Visual Basic (VB) classes, and then generates the code for those VB classes.

A more complex host may be a generic modeling tool that may be hosted through hosting layers in a variety of host shells, such as the shell 210 (FIG. 2). Such a modeling tool may model virtually anything, using one or more registered paradigms and one or more project types 300 (FIG. 3) dedicated to solving problems utilizing those paradigms in different problem domains. More complex hosts, such as a generic modeling tool, can be hosted in a number of shells (including VS, IE, MMC, and Access) through thin hosting layers to provide shell independence. As described below, these more-complex hosts may also implement the project types 300 (like VB project types) to provide scenario-based tool support for individual sets of paradigms without compromising paradigm independence.

In accordance with an aspect of the present invention and as described below, the VMF architecture represented in FIGS. 2 and 3, the visualization and modeling surface 202 comprises an HTML rendering engine 212 (e.g., browser and/or editor) such as found in Microsoft Corporation's Internet Explorer product. The surface 202 thus provides a complete HTML interpreter along with HTML editing capabilities. For example, the surface 202 supports dynamic models built from Visual Basic and C++ ActiveX® controls and behaviors, as well as static models rendered in XML/VML.

The surface 202 (which in one preferred implementation is an ActiveX® control) provides the actual drawing canvas on which model elements are arranged to form diagrams, represented in FIG. 4 as the modeling surface window 400. The surface 202 also acts as the central communication point for model elements to communicate with each other, including facilitating interconnection negotiations as further described in United States Patent Application/entitled "Negotiated Interconnection of Visual Modeling Elements," assigned to the Assignee of the present invention and herein incorporated by reference. As set forth below, most of the properties, methods and events of the surface 202 are directed to adding, editing and deleting model elements, and to managing the interactions between them.

In accordance with an aspect of the present invention, the surface 202 also includes a Visualization and Modeling Engine (VME) 214 that provides additional support for rendering and editing models beyond that available via the rendering engine 212. In other words, via extensions, the VME 214 provides capabilities that the rendering engine 212 does not natively provide. In one particular implementation using ActiveX® controls as represented in FIG. 3, a VMS host such as the host 204 may site the surface ActiveX® control 302, which provides standard ActiveX® interfaces to access the rendering engine 212. Alternatively, thin clients may access most of the same capabilities of the VMS ActiveX® control with Dynamic HTML, utilizing Document Object Model (DOM) extensions 304.

As also represented in FIGS. 2–4, paradigm servers 206 provide notations and semantics to hosts, such as the VMS host 204, independent from the functional use of those notations and semantics. In one implementation, a paradigm server 206 may comprise an ActiveX® control server dedicated to providing and controlling the model elements of a single modeling paradigm. A paradigm server (e.g., 206) will often be broken apart into to separate notation and semantic servers.

In general, a notation server 218 provides the shapes of the paradigm, as well as the basic behaviors and rules for editing and connecting those shapes. Notation servers (e.g., 218) may be implemented as VB or C++ custom control servers, or, for thin clients, they may comprise "behaviors" of the rendering engine 212.

Semantic servers (e.g., 220) provide direct access to the notation independent model (meta-data represented by the model). This is particularly useful for non-graphical hosts, like wizards and generators. Semantic servers may be COM class servers or behaviors for thin clients. By way of example, one graphic primitive server (e.g., 306 of FIG. 3) provides base shapes such as lines, polygons and ellipses from which more complex shapes may be constructed, i.e., it provides basic shapes to utilize as building blocks for the more complex notation objects of a paradigm server. Typical examples of controls provided by this server include base nodes ranging from simple non-sizable icons to more complex polygons or ellipses and base arcs ranging from simple node centered non-routable single segment arcs to routable multi-segment arcs with semantic adornments. These building blocks may encapsulate both shared graphical behavior such as drawing, zooming, resizing, moving, hovering, and selecting, as well as shared modeling behavior inherent in the communication protocols with the surface 202, the host, semantic objects, and other notation objects. Thus, many complex behaviors such as zooming, resizing, moving and surface communication protocols are built directly into these primitive shapes, which, as can be readily appreciated, significantly simplifies the building of a notation server. Notation servers and semantic servers are further described in United States Patent Application entitled "Pluggable Notations and Semantics for Visual Modeling Elements," assigned to the Assignee of the present invention and herein incorporated by reference.

A primitive server 306 shown in FIG. 3 (such as the graphic primitive server) may also provide any shared tools that multiple notations will likely wish to implement. For example, most model elements have some text which can often be formatted, and it would be inefficient for every paradigm server to contain its own text-formatting dialog and toolbar or in-place editing textbox. The graphic primitive server thus may contain these shared tools.

As further represented in FIG. 2, model persistence 208 may be provided as a generic pluggable component for a given tool. This component may be provided by the surface 202 or through a component known to the paradigm server 206. Persistence may be meta-model driven through information models or the paradigm server may already know the schema. More reusable paradigm servers will persist through a published persistence interface on a persistence component provided by the surface 202.

Model persistence is optional. If persisted, VMF models are preferably persisted in the Open Information Model (OIM) in the persistence/repository 208, and therefore can automatically be used by existing and future tools. OIM is based on the Unified Modeling Language (UML), which is a graphical language for visualizing and modeling. A suitable persistence stream for VMF is XML/VML, (extensible Markup Language/Vector Markup Language) however additional persistence formats, such as repository objects or database record sets, may be provided to the host. Moreover, in VMF, models are persisted through published COM interfaces for OIM and UML, whereby the actual persistence component may be easily changed from repository 208, to database tables, to XML or the like, without effecting the paradigm servers. This component architecture maximizes flexibility and extensibility and increases the preservation of investment in the individual components as the applications of those components change.

The model persistence/repository 208 is designed to be a point of interoperability for software vendors. Any information placed in the repository 208 can be read, updated and extended by any application with appropriate access to that repository 208. Since update access is exclusively through published (e.g., COM interfaces), adding application-specific extensions through new repository interfaces does not effect those applications already leveraging the existing interfaces.

As represented in FIGS. 3 and 4, the repository 208 may contain one or more models and/or templates 402, each of which may be composed of packages for organization. Templates 402 are static instances of models in the repository 208. They are usually designed to be examples or good starting points for modeling a vertical market domain, however they can also be design patterns (model structure templates) that can be utilized by wizards to apply a standard architectural design to a model. Many templates can be built dynamically as the user needs them through wizards.

A model instance 308 includes model elements, diagrams and the projections of those model elements onto those diagrams. If the model is persisted in a versioned repository 208 then a model instance includes the versions of model elements, diagrams and projections. Information models 310 specify the schema for persisting model instances. They are meta-models of model instances and contain meta-data about those instances. For example, the repository OIM 404 specifies the interfaces for persisting types, components and database entities. The schema of a particular database may comprise a model instance 308 of this information model 310.

As also represented in FIG. 3, the surface component 202 may provide universal shared components 312 that can be shared by hosts, such as to accomplish selection, hovering, zooming, and printing functions. Larger tools that may not be required by hosts and are thus optional may be provided as separate, pluggable components 314. This reduces the footprint requirements of smaller VMF applications that may not need these components, and the physical separation also makes it easy to provide several alternative implementations of these components. By way of example, model-independent persistence, such as XML/VML persistence, is a good candidate for a pluggable component because not every host will need every persistence mechanism, and indeed, some will not require a VMF provided persistence mechanism at all. As another example, automatic graph layout is a suitable candidate for a pluggable, shared component because layout algorithms are substantially different for different classes of modeling paradigms, and yet a single layout algorithm is often useful for many or all modeling paradigms within a class. Automatic layout is further described in United States Patent Application entitled "Incremental and Interruptible Layout of Visual Modeling Elements," assigned to the Assignee of the present invention and herein incorporated by reference.

FIG. 3 also shows a representation of project types, which plug into the host 204, e.g., through an application object. Project types may be UML-like collaborations described in the OIM of the repository 208. More particularly, each project type is a collaboration of modeling paradigms, tools 406 (FIG. 4), wizards 408, command bars and templates, registered in the repository 208 and designed to be used together to accomplish a task. Command bars comprise menu bars and toolbars, and act as the hooks that link the project type into the hosting environment (the surface 202 and shell 210). The tools 406 and wizards 408 of a project type 300 may be accessed through its command bars.

Project types can support a scenario, modeling paradigm, problem domain or an entire methodology. Virtually any scenario in the software development problem space may be addressed, e.g., abstraction layers, modeling paradigms, programming languages, product layers, product architectures, vertical market domains, development lifecycle and code architectures. Project types could be linked together into larger hierarchies to support many more complex scenarios.

Dynamic, Live Surface and Model Elements

In general, shapes rendered on the surface 202 are collectively referred to as model elements, (or projections). Projections are subtyped into two classes, namely nodes and arcs. Each model element instance projected on a diagram corresponds to exactly one model element in a repository 208, however the same repository 208 model element may be projected onto multiple diagrams or even several times onto the same diagram.

Figure 5:
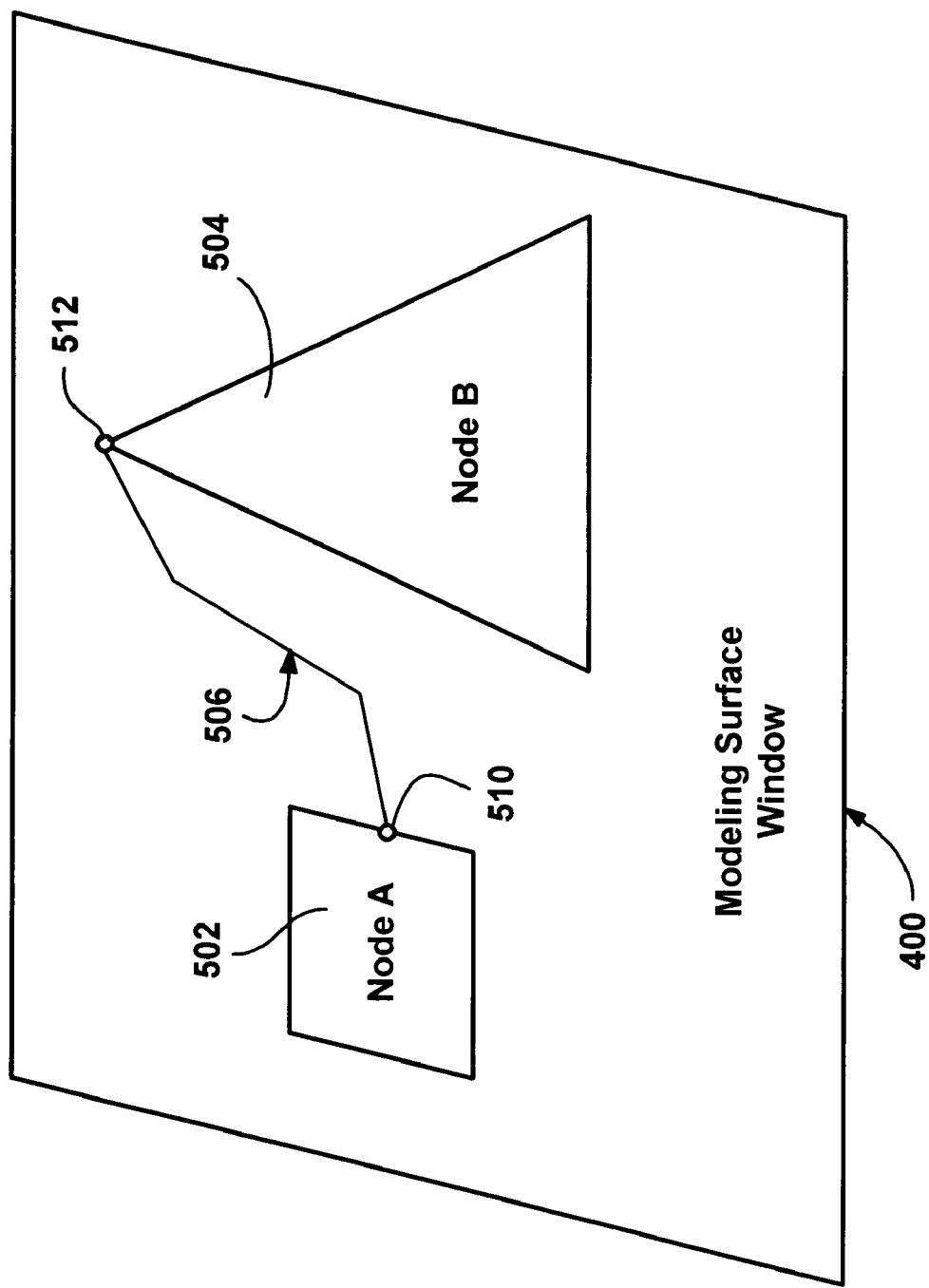
FIG. 5 is a representation of a live modeling surface window having live model elements thereon in accordance with an aspect of the present invention.
Figure 6:
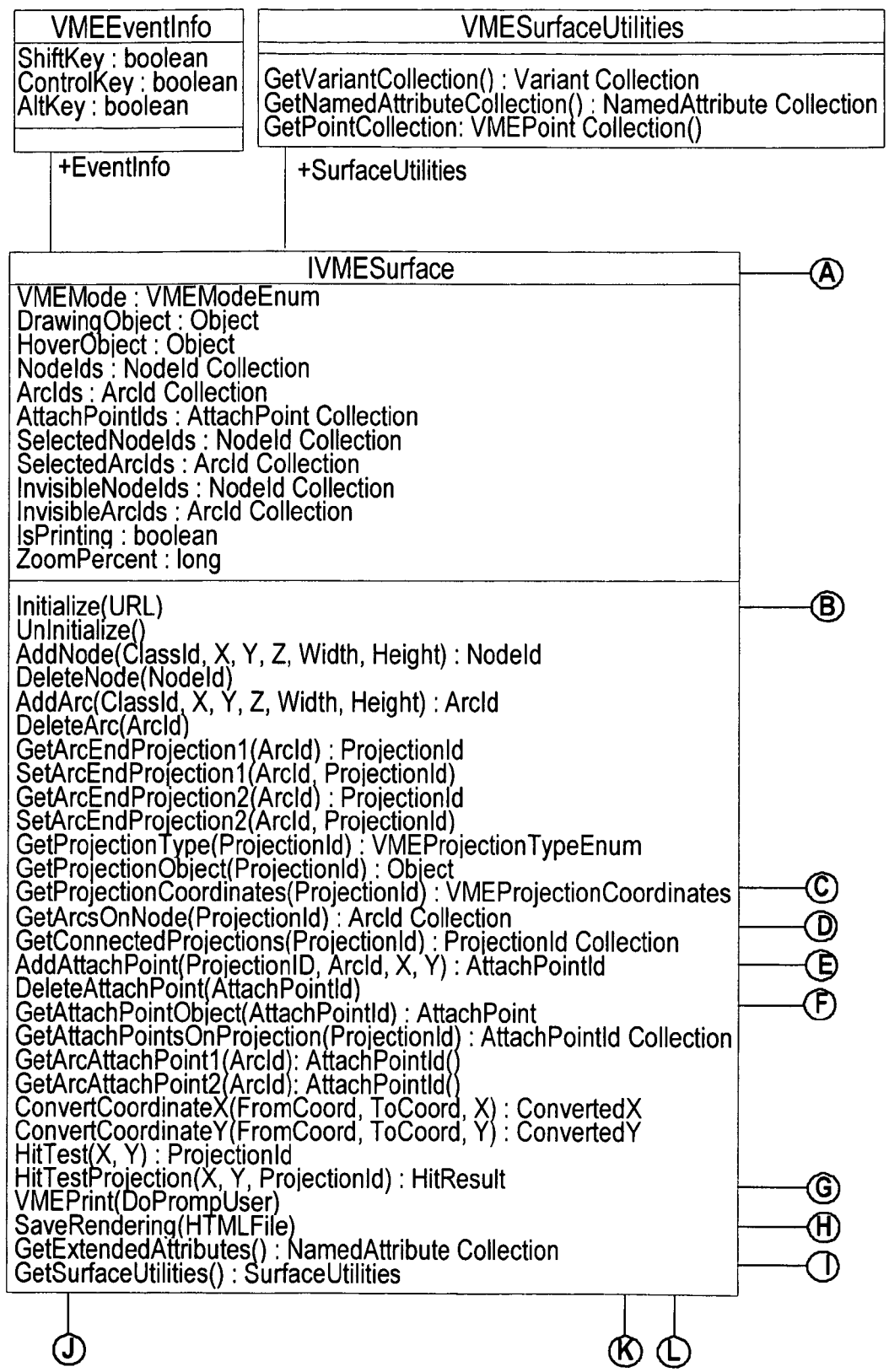
FIGS. 6–9 comprise a block diagram generally describing the VMF objects and certain interfaces and methods, including those of the surface control object and model element objects in accordance with an aspect of the present invention.

As generally represented in FIG. 5, each node 502, 504 is generally an icon, polygon, ellipse or other bounded shape, whereas an arc 506 is generally a line (possibly multi-segmented) that connects nodes (and sometimes other arcs) together. Arcs are used to connect two model elements together, semantically forming a relationship between the two. Model elements are typically peer ActiveX® controls on a window 400 of the surface 202. Properties of the model elements are persisted in the repository 208.

In one preferred embodiment, each model element in a model comprises an ActiveX® control. As such, each model element can autonomously control most of its presentation and much of its notational semantics. Usually, these controls will be light, windowless controls to improve scalability of models and therefore utilize the surface 202 or graphic primitive server to provide basic windowing capability where required. Note that while the behavior of projects and diagrams is type-specific and is implemented in the project type, and the behavior of model elements and their projections is type-specific, and is implemented in one of the paradigm servers, the behavior of other elements is type-independent and is implemented in the surface server 202. As generally represented in FIGS. 6–9, each such model element thus also includes component interfaces, the primary purpose of which is to handle component communication between model elements, between a paradigm server and the model elements it serves, and between the surface 202 and the model elements it contains. If a model element is comprised of a separate NotationObject and SemanticObject, each object can be accessed through the VMENode or VMEArc interface.

As also represented in FIG. 5, the exact point where the arc touches either of these nodes is known as the attach point. In FIG. 5, the two attach points are labeled 510 and 512. The two attach points are conceptually owned by the arc but are managed by the surface 202. For example, the surface 202 uses the attach points to determine whether other model elements may be affected when a model element is moved or resized, e.g., if a node is moved, then all of the arcs attached to that node will need to move with it. However, the surface 202 cannot move the affected model elements when an attach point moves, because it has insufficient information about how those projections should react to this move. In such an instance, the surface 202 is responsible for raising events (generally set forth in FIG. 7 and described below) so that each of the affected model elements can respond properly to the change.

As used herein, the surface 202 tracks various projection objects, including a hover object, a focus object, and a selected object. The hover object comprises the projection that the mouse pointer happens to be hovering (moving) over at a given point in time. The hover object is the object to which the next mouse event (e.g., a click) will be forwarded. There may be one hover object at any point in time, however it is also possible that the mouse is not hovering over any object.

The focus object is the control that currently has focus, according to the standard rules of control focus in windowing environments. For example, pressing tab will move focus from the current focus object to the next object in the tab order of the controls collection. The focus object is usually the object to which the next keyboard event will be forward. However, some keyboard events will affect multiple selected objects. To avoid user confusion, the focus object should always be one of the selected objects if any objects are selected, but the VME 214 does not enforce this. There will always be exactly one focus object in a given window at any point in time unless the window does not contain any controls.

Selected objects are projections that the user has selected, e.g., via the pointing device. There can be none, one or many selected objects at a given point in time. Selected objects should indicate that they are currently part of the selection by altering their appearance in some way, such as by displaying grab handles that the user may use to move or resize the projection. The purpose of selection is to provide a way for multiple objects to be manipulated simultaneously. For example, if multiple projections are selected and any one of them is moved, then any other selected projections should move by the same relative offset. For example, projection objects may be added to a selection by holding down the control key while clicking on an unselected object, or removed from the selection by holding down the control key and clicking on a selected object. If the control key is not pressed when an object is clicked, then the selection is reset to only contain the object currently being clicked on. The selection may be completely cleared by clicking anywhere on the surface 202 where no control is present.

Zooming is a shared responsibility between the surface 202 and the projections on that surface. If the zooming factor (percentage amount) changes, then the surface 202 informs each projection (e.g., by raising an OnZoomPercentChange event, (described below) so that the projection can resize itself as appropriate. However, the surface 202 is responsible for moving the projections as necessary to make room for their new sizes. In some cases, a projection may not be able to distinguish between two zooming factors that are very close, (e.g., eighteen versus nineteen percent zoom), whereby the projections need to reset their sizes to appropriate values and raise the appropriate resize event on their event interface.

The VME 214 has three coordinate systems, including screen, client, and document. The screen coordinate system is relative to the upper left corner of the monitor. The client coordinate system is relative to the upper left corner of the visible client area of the surface 202. The document coordinate system is relative to the upper left corner of the entire document rendered on the surface 202. In each case, the upper left corner is the origin of the coordinate system, with the X-coordinate values increasing moving right, and the Y-coordinate values increasing moving down. In each coordinate system, the values of the coordinates are expressed in pixels. The ConvertCoordinateX and ConvertCoordinateY methods on the surface 202 may be used to convert points between these three coordinate systems. Unless explicitly stated otherwise, any method in the VME 214 that requires a coordinate as a parameter expects that coordinate to be expressed in the document coordinate system. This is because the position of a projection on the surface 202 changes in both the client and screen coordinate systems as the user scrolls around the document but it is always the same in the document coordinate system.

Hit testing is the process of determining which of the projections on the surface 202 the mouse is currently hovering over or clicking on. In most windows applications, hit testing is not very complicated, because most controls are close to rectangular and therefore neatly fit inside a bounding rectangle. In addition, controls are not often stacked very deeply, and usually the control on the top of the stack is the one being hit. However, in object-based drawing and modeling applications, hit testing is a bit more complicated, as users want much more fine-grained control over which object they are clicking on, and because users often need to click on objects much deeper in the control stack.

In general, in four-point hit testing, various projections return a value indicative of a closeness of a hit (mouse-click) thereto, e.g., level 3 is a direct hit, level 2 is close, level 1 is a click on a transparent part of the shape and level 0 is a miss. A hit is determined in the VME 214, by evaluating the relative values returned by the model elements, e.g., a direct hit of level 3 is better than any close hits of level 2, each of which in turn are better than any level 1 hits.

The rendering engine 212 does not natively handle the four-level hit test result necessary for the fined-grain hit testing required by a modeling tool, however both the VME 214 and the modeling elements (ActiveX® controls) are capable of doing so. To this end, the VME 214 intercedes between the rendering engine 212 and the ActiveX® projection controls to ensure the rendering engine 212 gets the hit result the user is expecting, while enabling these controls to fully and properly implement hit testing.

ActiveX components in VMF comply with certain basic conventions. For example, objects that are typically instantiated in numbers greater than one are automatically assigned a session-unique long identity value. This identity is set by the VME 214 upon the initialization of the object, and is thereafter a read-only value. This identity is often used to retrieve the corresponding object, and to establish or traverse relationships, as set forth in the various methods described below. In some cases, identities may belong to a larger class of identities. For example, ArcIds and NodeIds are subtypes of ProjectionIds. In these cases, a subtype identity may be used anywhere the supertype identity is required. Either an ArcId or a NodeId may be used in a method that takes a parameter of type ProjectionId.

Most collections in VMF servers are collections of identities, not collections of objects. In each of these cases, a method is provided on a directly accessible interface to retrieve the object with that identity. Since only the VME 214 can establish identity, these collections are read-only collections. Methods for adding objects to these collection or deleting objects from these collections are available on the same interface as the method for retrieving an object with its identity. The collections themselves support the standard count, item and enumeration methods.

Objects actively interact with each other through their exposed interfaces. The surface, nodes, arcs and attach points expose one or more interfaces containing the properties and methods they wish to be available for public use. The communication that takes place through these interfaces actively involves two known parties.

Sometimes objects need to communicate a message out that may not need any response. In such instances, the object sends these passive messages by raising events on event interfaces. These events are raised for the benefit of the receiver of the message. Regardless if any receivers actually receive these messages, each object's only obligation is to send the message so that it can be received.

Figure 7:
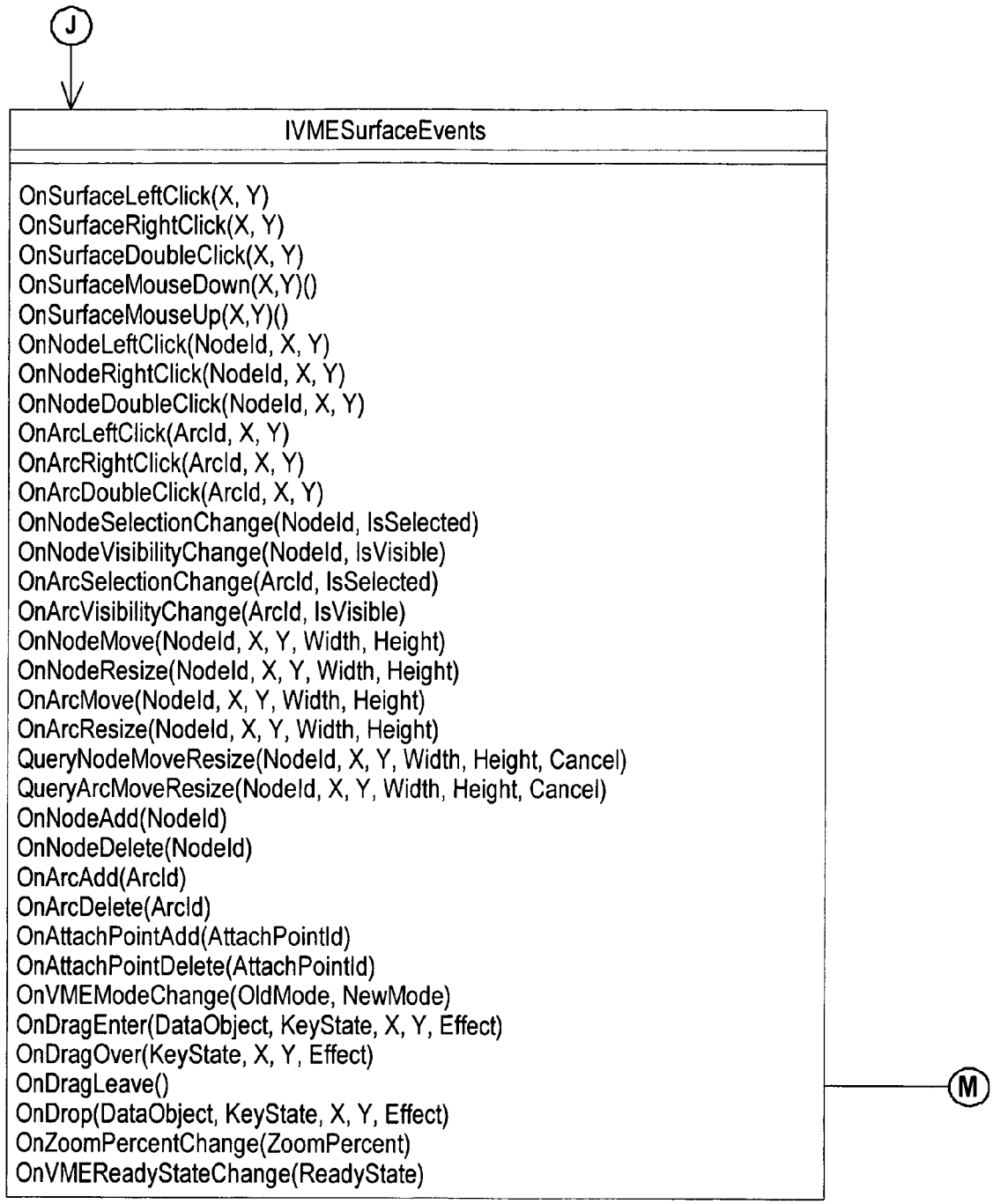
Figure 8:
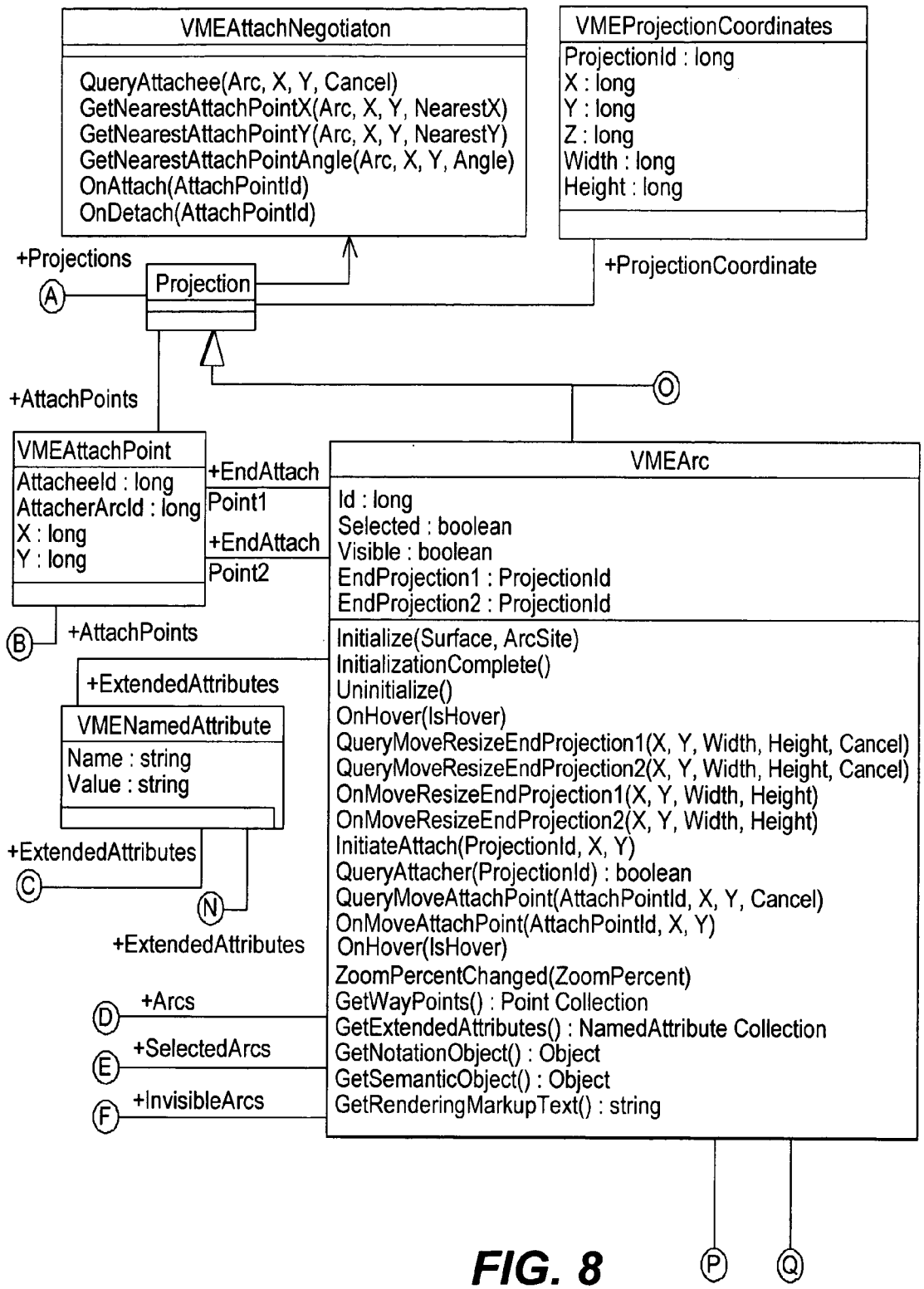
Figure 9:
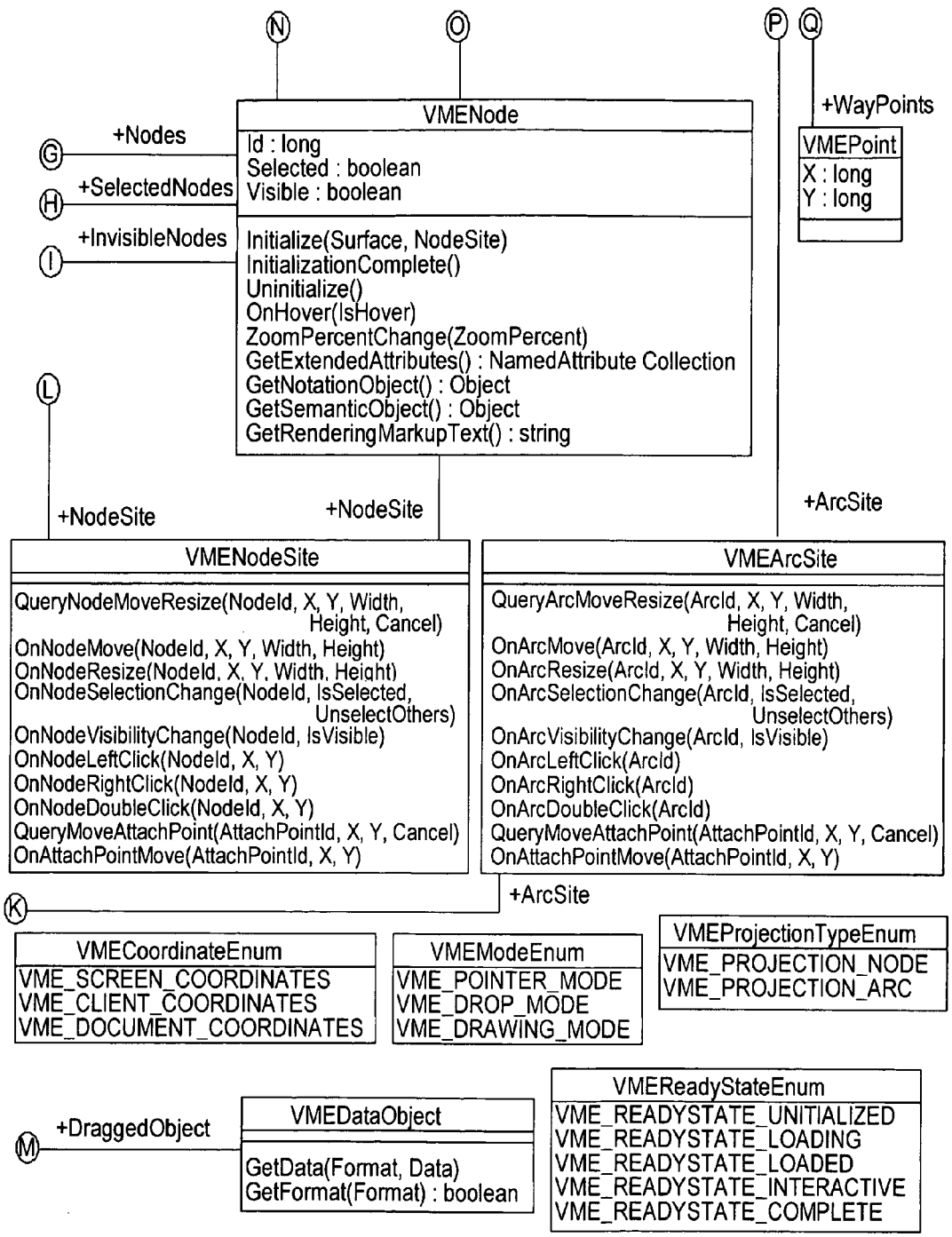

As represented in FIG. 7, the surface exposes an event interface named IVMESurface Events so that the host may react to activities happening on the surface 202. The surface 202 provides a single node site object that is shared by all nodes. The node site implements the VMNodeSite interface. The nodes use this object to communicate events to the surface 202 that may, in turn, use the IVMESurface Events interface to communicate events on to the host. The surface 202 also provides a single arc site object that is shared by all arcs. This arc site implements the VMArcSite interface. The arcs use this object to communicate events to the surface 202 that may, in turn, use the IVMESurface Events interface to communicate events on to the host.

In accordance with the present invention, use of a live surface 202 enables a completely new range of scenarios to happen in the domain of visual modeling and topological displays. The VME surface 202 acts as a dynamic, live surface by basing its services on the HTML services in the rendering engine 212. Note that one preferred rendering engine 212 (found in Microsoft Corporation's Internet Explorer product) is not usable by itself as a modeling surface, but instead, modeling services are built on the rendering engine 212 by wrapping up and extending the rendering engine 212, although conceptually the model diagram exists as a HTML page within the rendering engine 212. Instead, VME services are available as an extension to the rendering engine object model for programming from within the HTML page and also from the tool/shell hosting the VME 214. However, it is feasible to develop a rendering engine that includes conventional rendering functionality and the functionality provide by the VME 214 in a single control or other component.

As generally represented in FIGS. 6–9 and described below, the VME 214 extends the rendering engine 212 through many interfaces (and/or methods accessed therethrough, described below), including interfaces to enumerate nodes and arcs and their relationships, to add, delete or change connections of nodes/arcs, and to initialize the surface 202. This can either load an existing diagram or initialize for a new diagram. A URL can be specified to act as the background or the starting point for a new diagram.

The surface 202 is referred to as a 2.5D (as opposed to 2D or 3D) surface. In general, this means that apart from having X and Y coordinates, each object has a Z-coordinate that indicates the layering of the surfaces. This enables objects to be layered, e.g., which hides all or part of another object, and so forth. When specifying a HTML page as the background, a Z-order can be specified for the page. Other objects may then be placed above or below this Z-order. The Z-orders can be raised or lowered at runtime if necessary for example in response to user input.

As also represented in FIGS. 6–9 and described below, the surface 202 also includes an interface (method) to select/unselect model elements or groups of model elements, an interface to show/hide model elements or groups of model elements, and an interface to make areas of the surface editable so that the user can enter annotations on the surface. There are also interfaces to print model diagrams, to set zoom factors for the whole diagram or portions of the diagram, and to enable layouts of model diagrams. Other interfaces define notation objects, semantic objects, and how nodes and arcs are composed of notations and semantics. Still other interfaces define how diagrams get persisted, e.g., pluggable persistence is provided whereby persistence can be to a URL, file, database, email or any store.

Interfaces are provided to change a style (or 'skin') of the displayed surface. The color schemes, fonts and so on can thus be dynamically changed for the whole diagram. Interfaces are also provided to describe a coordinate system in Visual Modeling terms, wherein such coordinate systems are not what are used by the rendering engine 212. Also, as generally listed in FIGS. 6–9 and described below, interfaces are provided to raise events when model elements are being hovered on, clicked on, dragged/dropped, connected to each other, laid-out, resized, repositioned, shown/hidden, selected/unselected, added/deleted, or performing interconnection negotiations and other activities related to modeling.

The following examples describe a few of the many ways in which a dynamic surface 202 and model elements may be used to provide numerous benefits over static surfaces and elements. These examples are in no way limiting, but are only provided to emphasize the flexibility and utility of the present invention.

One example utilizes a copy of an existing HTML file, e.g., accessed via a URL, as a starting surface. For example, model elements such as representing network components and their interconnections distributed across the United States may be placed on background surface comprising a live Web Page showing the weather (or other) map of the United States. When finished, the state of the network diagram may then be saved as an HTML page, or in some other format. The surface can be visualized live, e.g., if a connection is severed between a server and a router, the arc connecting the model elements representing those components can change itself visibly and/or otherwise take action (e.g., cause an alarm to be sounded, send an e-mail, page someone) to draw attention to the break.

Another example of the many possible benefits available via the live surface 202 and modeling elements can be found by combining of a modeling surface with a dynamic help screen, animation, instructional video or the like that walks users through steps in designing or creating something on the surface. For example, users may make many errors when laying out complex diagrams such as a database schema. The model elements and the surface 202 can detect such errors themselves, and, if the background comprises an HTML page or the like, the background content can change dynamically in response to the user actions to guide, train and/or correct the user.

Still another example is directed to the linking different "diagrams" or models, e.g., distributed across the Internet, into a new diagram on the surface. To this end, the dynamic surface 202 and model elements can be used to link in external sources of information or related visualization/modeling diagrams. Thus, collaborative modeling is facilitated, as multiple users can make changes to a diagram comprising linked information.

Interfaces, Properties and Methods

The following sets forth details for the visualization and modeling engine and model elements, as generally represented in FIGS. 6–9. MSVME is the hosting ActiveX® server of VME. Most applications utilizing the VMF will reference this server and create at least one instance of the VMESurface 202 component 202. This server has two primary purposes. First, it provides the primary engine components and services. Second, it converts the DocObject containment model native to the rendering engine 212 to the more common ActiveX® containment model of most Win32 applications. The ActiveX® containment model tends to be more controlled and self contained, and therefore more robust. Applications that wish to stay with the DocObject model because it is more flexible and accessible in their particular environment can still access the DOM extensions of VMF through the MSVMO server or behaviors. Such applications do not need the MSVME server but may still wish to utilize some of the supporting VME servers documented below.

VMESurface

The surface component is the entry point of the VME server. It functions as both the document onto which projections (arcs and nodes) are rendered as well as the application object for the server. Some of the first lines of any VME host application will be to create an instance of the VMESurface class and call its initialization method. It has two primary co-created interfaces: IVMESurface and IVMESurfaceEvents.

IVMESurface

This is the default interface of the VMESurface class. It contains the properties and methods of the surface.

VMEMode: VMEModeEnum

This property indicates the current drawing mode of the surface. There are three modes: Pointer, Drop, and Drawing. These modes generally correspond to "editing existing projections", "ready to add new projections", and "in the process of adding a new projection" respectively. Most of the time, the surface is in pointer mode. In Pointer mode, existing projections may be selected, moved, and resized on the surface. They may also be communicated with and graphically altered, both semantically and indirectly. Drop mode means that one or more new projections are about to be placed on the surface. The user's selecting of a new projection (shape) from the toolbar is a typical way to enter this mode. Drawing mode means that the user is in the process of adding a new projection. This mode is necessary because the process of adding a new projection often requires multiple mouse clicks. During the time following the first mouse click, (the one that drops the new projection on the surface), and before the final mouse click that fully specifies the new projection, the surface is in drawing mode. In the case of adding a new arc, the surface is placed in drawing mode when the user clicks to specify the first attach point of the arc. The surface remains in drawing mode until the user cancels the drawing operation or until the user clicks to specify a final attach point. On a multi-segment arc, there may be any number of clicks to specify way points in between, and the surface is in drawing mode this entire time.

The surface mode often alters the behavior of many of the projections on that surface in response to surface events. For example, when the surface is in pointer mode, hovering the mouse over an existing projection on the surface will often cause the projection to alter its appearance to make it noticeable that the next click event will be forwarded to that projection. However, if the surface is in drop mode, then only shapes that accept the new projection to be dropped will be visibly altered in this manner. Specifically, if the new projection is an arc, then only projections that can be connected by that type of arc will be visibly altered. If the surface is in Drawing mode, than sometimes even fewer projections will be visibly altered, or none at all.

DrawingObject: Object

This property points to the new projection currently being placed on the surface. This property is set when the VMEMode property is set to Drop, remains set when the VMEMode property transitions from Drop to Drawing, and then is reset when the VMEMode property is moved out of Drawing. Setting this property allows projections that are already on the surface to interact with the new projection being placed on the surface during the placement and drawing processes.

HoverObject: Object

This property points to the projection on the surface over which that the mouse is currently hovering. This is the same projection that last received the OnHover event on its VMENode or VMEArc interface. If the mouse is not currently hovering over any projection, then this property will be set to nothing. Hover, Focus and Selected Objects are described above.

EventInfo: VMEEventInfo

This property points the VMEEventInfo object. This object contains additional supplementary information about the most recent surface event.

NodeIds: NodeId Collection

This property is a read-only collection of the identities of the nodes on the surface. The node objects with these identities may be retrieved using the GetProjectionObject method.

ArcIds: ArcId Collection

This property is a read-only collection of the identities of the arcs on the surface. The arc objects with these identities may be retrieved using the GetProjectionObject method.

AttachPointIds: AttachPointId Collection

This property is a read-only collection of the identities of the AttachPoints on the surface. The attach point objects with these identities may be retrieved using the GetAttachPointObject method.

SelectedNodesIds: NodeId Collection

This property is a read-only collection of the identities of the nodes on the surface that are currently selected. The node objects with these identities may be retrieved using the GetProjectionObject method.

SelectedArcsIds: ArcId Collection

This property is a read-only collection of the identities of the arcs on the surface that are currently selected. The arc objects with these identities may be retrieved using the GetProjectionObject method InvisibleNodesIds: NodeId Collection This property is a read-only collection of the identities of any nodes on the surface that are currently invisible. The node objects with these identities may be retrieved using the GetProjectionObject method. Invisible nodes on the surface will still have coordinates, will still persist with the diagram, and essentially still exist for most purposes. However, invisible nodes will not respond to user generated events, and therefore should not be part of the current selection or receive focus.

InvisibleArcsIds: ArcId Collection

This property is a read-only collection of the identities of the arcs on the surface that are currently invisible. The arc objects with these identities may be retrieved using the GetProjectionObject method. Invisible arcs on the surface will still have coordinates, will still persist with the diagram, and essentially still exist for most purposes. However, invisible arcs will not respond to user generated events, and therefore should not be part of the current selection or receive focus.

IsPrinting: Boolean

This property indicates that the surface is currently in the process of printing. This flag is useful for projections that need to draw themselves differently when printing (in contrast to when drawing themselves on a monitor).

ZoomPercent: Long

This property contains the zoom factor for the graph and the projections on the surface. For example, a ZoomPercent of 50 indicates that the graph is half its normal size, while a ZoomPercent of 200 indicates that the graph is twice its normal size. When this property is set, the ZoomPercentChange event is raised on any projections on the surface so that they may resize themselves approximately to conform with the new zoom percent. Zooming is generally described above.

Initialize(URL: String)

This method prepares the surface for use, and thus needs to be called before projections may be added to the surface. The URL parameter may indicate a background web page to which the new projections will be added. If the URL parameter is an empty string, then the new projections will be added to a new blank page.

Uninitialize( )

This method releases the surface resources. It needs to be called if the current surface is to be reused for a new graph, and should be called whenever the surface is being released.

AddNode(ClassId: String, X: Long, Y: Long, Z: Long, Width: Long, Height: Long): NodeId This method adds a new node to the surface at a distance X from the left edge of the surface and a distance Y from the top edge of the surface. The type of the new node to be added is indicated by the ClassId, which may be either a COM ClassId or a ProgId. The Width and Height indicate the size of the bounding rectangle of the node's control. The node itself may be smaller than its bounding rectangle. The automatically assigned long identity of the new node is passed back as the return parameter. This identity may be passed to the GetProjectionObject method to retrieve the newly created node object.

DeleteNode(NodeId: Long)

This method removes and releases the node on the surface specified by the NodeId parameter.

AddArc(ClassId: String, X: Long, Y: Long, Z: Long, Width: Long, Height: Long): ArcId This method adds a new arc to the surface at a distance X from the left edge of the surface and a distance Y from the top edge of the surface. The type of the new arc to be added is indicated by the ClassId, which may be either a COM ClassId or a ProgId. The Width and Height indicate the size of the bounding rectangle of the arc's control. The arc itself may be smaller than its bounding rectangle and may contain any number of way points describing its various line segments. The automatically assigned long identity of the new arc is passed back as the return parameter. This identity may be passed to the GetProjectionObject method to retrieve the newly created arc object.

DeleteArc(ArcId: Long)

This method removes and releases the arc on the surface specified by the ArcId parameter.

GetArcEndProjection1(ArcId: Long): ProjectionId

This method returns the identity of the projection attached to the beginning of the arc. The projection object with this identity may be retrieved using the GetProjectionObject method.

SetArcEndProjection1(ArcId: Long, ProjectionId: Long)

This method sets the projection to be attached to the beginning of the arc. This method is called in conjunction with the AddAttachPoint method to completely attach the beginning of an arc to a projection GetArcEndProjection2(ArcId: ArcId): ProjectionId This method returns the identity of the projection attached to the end of the arc. The projection object with this identity may be retrieved using the GetProjectionObject method.

SetArcEndProjection2(ArcId: Long, ProjectionId: Long)

This method sets the projection to be attached to the end of the arc. This method should be called in conjunction with the AddAttachPoint method to completely attach the end of an arc to a projection.

GetProjectionType(ProjectionId: Long): ProjectionTypeEnum

This method returns an enumeration constant indicating whether the projection specified by the projection ID is a node or an arc.

GetProjectionObject(ProjectionId: Long): Projection

This method returns a pointer to the projection on the surface with the specified identity. The method is often used directly following a method that returns an ArcId, NodeId, or ProjectionId to get a pointer to the actual arc or node with that ID.

GetProjectionCoordinates(ProjectionId: Long): VMEProjectionCoordinates

Every arc or node on the surface has exactly one corresponding VMEProjectionCoordinate object that contains the X (left), Y(top), Width, and Height as well as the Z order of the bounding rectangle of the projection's control. This method returns the VMEProjectionCoordinate object corresponding to the projection with the specified ID.

GetArcsOnNode(ProjectionId: Long): ArcId Collection

This method returns a collection of the IDs of all arcs attached to the specified projection. Note that this method is somewhat of a misnomer because the projection specified by the projection ID may itself be an arc, not just a node. This method is very similar to the GetConnectedProjections method, except this method returns the arcs and that method returns the projections on the other end of those arcs. The arc objects with the identities returned by this method may be retrieved using the GetProjectionObject method.

Arcs are unique projections in that they always connect exactly two projections, but may also be connected to by anywhere from zero to relatively many other arcs. Note that if the specified projection is an arc, and that arc happens to connect a couple of arcs together, these two arcs will not be returned by this method. This method only returns the zero-to-many arcs connected to the projection, and not the zero, one, or two arcs to which the arc projection may connect.

GetConnectedProjections(ProjectionId: Long): ProjectionId Collection

This method returns a collection of the IDs of the projections that are directly connected to the specified projection via a single arc. It finds the arcs that are attached to the specified connection, and it finds those projections that are attached to the other end of those arcs. Note that where the GetArcsOnNode method returns the arcs connected to the specified projection, this method returns the projections on the other end of those arcs. The arc objects with the identities returned by this method may be retrieved using the GetProjectionObject method.

AddAttachPoint(ProjectionId: Long, ArcId: Long, X: Long, Y: Long): AttachPointId This method adds a new attach point to the surface at the location specified by X and Y connecting the specified arc (the attacher) to the specified projection (the attachee), and returns the ID of that new attach point. The Attacher should call this method. The surface informs the Attachee of the attachment by invoking the OnAttach method the Attachee's VMEAttachNegotiation interface. The attach point object with the identity returned by this method may be retrieved using the GetAttachPointObject method.

DeleteAttachPoint(AttachPointId: Long)

This method deletes the specified attach point from the surface. The Attacher calls this method. The surface informs the Attachee of the detachment by invoking the OnDetach method the Attachee's VMEAttachNegotiation interface.

GetAttachPointObject(AttachPointId: Long): AttachPoint

This method returns a pointer to the attach point on the surface with the specified identity. The method is often used directly following a method that returns an AttachPointId to get a pointer to the actual attach point with that ID.

GetAttachPointsOnProjection(ProjectionId: Long) AttachPointId Collection

This method returns the IDs of the attach points that are attached to the specified projection. If the specified projection is an arc, then the collection will not include the IDs of the projections to which the arc is attached. This method is very similar to the GetArcsOnNode method, except that method returns the IDs of the arcs attached to the projection, whereas this method returns the IDs of the attach points of those arcs. The attach point objects with the identities returned by this method may be retrieved using the GetAttachPointObject method.

GetArcAttachPoint1(ArcId: Long): AttachPointId

Every arc connects two projections. The exact point where it connects to either of these projections is an attach point. This method returns the ID of the first of these two attach points for the specified arc. The attach point object with the identity returned by this method may be retrieved using the GetAttachPointObject method.

GetArcAttachPoint2(ArcId: Long): AttachPointId

Every arc connects two projections. The exact point where it connects to either of these projections is an attach point. This method returns the ID of the second of these two attach points for the specified arc. The attach point object with the identity returned by this method may be retrieved using the GetAttachPointObject method.

ConvertCoordinateX(FromCoord: CoordSystemEnum, ToCoord: CoordSystemEnum, X: Long): Long This method converts the specified X coordinate from the coordinate system specified by the FromCoord, to the coordinate system specified by the ToCoord, and returns the new coordinate.

ConvertCoordinateY(FromCoord: CoordSystemEnum, ToCoord: CoordSystemEnum, Y: Long): Long This method converts the specified Ycoordinate from the coordinate system specified by the FromCoord to the coordinate system specified by the ToCoord and returns the new coordinate.

HitTest(X: Long, Y: Long): ProjectionId

This method returns the ID of the projection located at the specified X and Y coordinates. There may be several projections located at these coordinates, but only one will be hit, as described above with reference to "Hit Testing" concepts.

HitTestProjection(X: Long, Y: Long, ProjectionId: Long): HitResultEnum

This method returns the four-level hit result of the specified projection for the point specified by the X and Y coordinates. If the point is outside the bounding rectangle of the control of the projection then this method will return a Miss (0). Otherwise, it will return a result according to the logic described above with reference to "Hit Testing" concepts.

VMEPrint(DoPromptUser: Boolean)

This method instructs the surface to print the graph currently on the surface. If the DoPromptUser parameter is set to true, then a dialog will appear allowing the user to specify the printer, page setup and other print settings before printing. Otherwise, the diagram will print on the default printer with standard print settings. Printing is paradigm independent, and is handled completely within the VME surface. The rendering engine surface simply draws the page onto an in-memory DC that VME then scales by an aspect ratio onto the printer DC.

SaveRendering(HTMLFile: String)

This method instructs the surface to save the graph currently on the surface to the specified file. If the file already exists, then it will be overwritten. To gather the HTML for the file, the surface invokes GetRenderingMarkupText method on the VMENode and VMEArc interfaces of each projection, and concatenates them together in a "blob" of data. This method then concatenates some header information with the blob, and writes the entire stream to the file.

GetExtendedAttributes( ): NamedAttribute Collection

Extended attributes are name/value pairs (NamedAttrbributes) that can be arbitrarily added to any of the major objects in VME. They provide a general-purpose extensibility mechanism for adding new properties to an object at run time. For example, this provides a convenient way for VMS hosts to temporarily store session-specific parameters and/or persist host specific properties. On this interface, this method returns a read/write collection of NamedAttributes for the surface itself.

GetSurfaceUtilities( ): VMESurfaceUtilities

The VMESurfaceUtilities class is described below. This method simply returns a new instance of that class. The only reason this functionality appears as a method is to preserve the single entry point concept of the MSVME server.

IVMESurfaceEvents

This is the second of the two primary interfaces of the VMESurface class. It contains all of the events of the surface, as represented in FIG. 7. The host of the surface will receive these events automatically when they occur. All of the node or arc specific events on this interface are raised indirectly when similar events (usually events with the exact same name) are raised on the VMENodeSite or VMEArcSite interfaces by the individual projections that first detected them. Note that the host should rarely need to respond to any of the events on this interface, since the surface and/or the contained projections already implement the primary behavior of each of these events. This is particularly true for the node and arc specific events.

OnSurfaceLeftClick(X: Long, Y: Long)

This event will be raised if the user clicks on the surface and no projection control responds to the hit test with a result greater than miss. In other words, the user clicked on an empty part of the surface. The X and Y coordinates of the point clicked on are provided as parameters to the event. On a normal user click, where the mouse is captured or does not move between the time the mouse button goes down and the time the mouse button comes back up, the OnSurfaceMouseDown event will be followed by the OnSurfaceMouseUp event which is, in turn, followed by the OnSurfaceLeftClick event.

OnSurfaceRightClick(X: Long, Y:Long)

This event will be raised if the user right clicks on the surface and no projection control responds to the hit test with a result greater than miss. In other words, the user clicked on an empty part of the surface. The X and Y coordinates of the point clicked on are provided as parameters to the event.

OnSurfaceDoubleClick(X: Long, Y: Long)

This event will be raised if the user double clicks on the surface and no projection control responds to the hit test with a result greater than miss. In other words, the user double-clicked on an empty part of the surface. The X and Y coordinates of the point clicked on are provided as parameters to the event.

OnSurfaceMouseDown(X: Long, Y:long)

This event will be raised if the user presses the left mouse button down while hovering the mouse pointer over the surface and no projection control responds to the hit test with a result greater than miss. In other words, the mouse is hovering over an empty part of the surface. The X and Y coordinates of the point the mouse is hovering over are provided as parameters to the event. On a normal user click, where the mouse is captured or does not move between the time the mouse button goes down and the time the mouse button comes back up, the OnSurfaceMouseDown event will be followed by the OnSurfaceMouseUp event which is, in turn, followed by the OnSurfaceLeftClick event.

OnSurfaceMouseUp(X: Long, Y: Long)

This event will be raised if the user releases the left mouse button while hovering the mouse pointer over the surface and no projection control responds to the hit test with a result greater than miss. In other words, the mouse is hovering over an empty part of the surface. The X and Y coordinates of the point the mouse is hovering over are provided as parameters to the event. On a normal user click, where the mouse is captured or does not move between the time the mouse button goes down and the time the mouse button comes back up, the OnSurfaceMouseDown event will be followed by the OnSurfaceMouseUp event which is, in turn, followed by the OnSurfaceLeftClick event.

OnNodeLeftClick(NodeId: Long, X: Long, Y: Long)

This event is raised automatically by VME when the event with the same name is raised on the VMENodeSite interface by the node that was clicked on. The ID of the node that was clicked on, and the X and Y coordinates where the click occurred, are provided as parameters.

OnNodeRightClick(NodeId: Long, X: Long, Y: Long)

This event is raised automatically by VME when the event with the same name is raised on the VMENodeSite interface by the node that was right clicked on. The ID of the node that was right clicked on, and the X and Y coordinates where the click occurred, are provided as parameters.

OnNodeDoubleClick(NodeId: Long, X: Long, Y: Long)

This event is raised automatically by VME when the event with the same name is raised on the VMENodeSite interface by the node that was double-clicked on. The ID of the node that was double-clicked on, and the X and Y coordinates where the click occurred, are provided as parameters.

OnArcLeftClick(ArcId: Long, X: Long, Y: Long)

This event is raised automatically by VME when the event with the same name is raised on the VMEArcSite interface by the arc that was clicked on. The ID of the arc that was clicked on, and the X and Y coordinates where the click occurred, are provided as parameters.

OnArcRightClick(ArcId: Long, X: Long, Y: Long)

This event is raised automatically by VME when the event with the same name is raised on the VMEArcSite interface by the arc that was right-clicked on. The ID of the arc that was right-clicked on, and the X and Y coordinates where the click occurred, are provided as parameters.

OnArcDoubleClick(ArcId: Long, X: Long, Y: Long)

This event is raised automatically by VME when the event with the same name is raised on the VMEArcSite interface by the arc that was double-clicked on. The ID of the arc that was double-clicked on, and the X and Y coordinates where the click occurred, are provided as parameters.

OnNodeSelectionChange(NodeId: Long, IsSelected: Boolean)

This event is raised automatically by VME when the event with the same name is raised on the VMENodeSite interface by the node whose selection has changed. The ID of the node and a flag indicting whether the node is now selected or unselected are provided as parameters.

OnNodeVisibilityChange(NodeId: Long, IsVisible: Boolean)

This event is raised automatically by VME when the event with the same name is raised on the VMENodeSite interface by the node whose visibility has changed. The ID of the node and a flag indicting whether the node is now visible or invisible are provided as parameters.

OnArcSelectionChange(ArcId: Long, IsSelected: Boolean)

This event is raised automatically by VME when the event with the same name is raised on the VMEArcSite interface by the arc whose selection has changed. The ID of the arc and a flag indicting whether the arc is now selected or unselected are provided as parameters.

OnArcVisibilityChange(ArcId: Long, IsVisible: Boolean)

This event is raised automatically by VME when the event with the same name is raised on the VMEArcSite interface by the arc whose visibility has changed. The ID of the arc and a flag indicting whether the arc is now visible or invisible are provided as parameters.

OnNodeMove(NodeId: Long, X: Long, Y: Long, Width: Long, Height: Long)

This event is raised automatically by VME when the event with the same name is raised on the VMENodeSite interface by the node that moved. The NodeId of the node that moved and the new X and Y coordinates of its bounding rectangle are provided as parameters. The Width and Height of the node's bounding rectangle, which should not have changed, are provided only for convenience.

OnNodeResize(NodeId: Long, X: Long, Y: Long, Width: Long, Height: Long)

This event is raised automatically by VME when the event with the same name is raised on the VMENodeSite interface by the node that changed size. The NodeId of the node that changed size and the new Width and Height of its bounding rectangle are provided as parameters. The X and Y coordinates of the node's bounding rectangle, which should not have changed, are provided only for convenience.

OnArcMove(ArcId: Long, X: Long, Y: Long, Width: Long, Height: Long)

This event is raised automatically by VME when the event with the same name is raised on the VMEArcSite interface by the arc that moved. The ArcId of the arc that moved and the new X and Y coordinates of its bounding rectangle are provided as parameters. The Width and Height of the arc's bounding rectangle, which should not have changed, are provided only for convenience.

OnArcResize(ArcId: Long, X: Long, Y: Long, Width: Long, Height: Long)

This event is raised automatically by VME when the event with the same name is raised on the VMEArcSite interface by the arc that changed size. The ArcId of the arc that changed size and the new Width and Height of its bounding rectangle are provided as parameters. The X and Y coordinates of the arc's bounding rectangle, which should not have changed, are provided only for convenience.

QueryNodeMoveResize(NodeId: Long, X: Long, Y: Long, Width: Long, Height: Long, Cancel: Boolean)

This event is raised automatically by VME when the event with the same name is raised on the VMENodeSite interface by the node that is about to move or change size. The NodeId of the node that is about to move or change size and the new X and Y coordinates and Width and Height of the bounding rectangle it will have are provided as parameters. The surface invokes one of the QueryMoveResizeEndProjection methods on the VMEArc interface of each arc attached to this node. The purpose of this event is to give the host or any attached arcs a chance to cancel the change if they have reason to believe the change should not occur. The Cancel parameter is an output parameter whose default value is False. Setting the Cancel parameter to True will stop the move or resize from occurring.

QueryArcMoveResize(ArcId: Long, X: Long, Y: Long, Width: Long, Height: Long, Cancel: Boolean)

This event is raised automatically by VME when the event with the same name is raised on the VMEArcSite interface by the arc that is about to move or change size. The ArcId of the arc that is about to move or change size and the new X and Y coordinates and Width and Height of the bounding rectangle it will have are provided as parameters. The surface invokes one of the QueryMoveResizeEndProjection methods on the VMEArc interface of each arc attached to the specified arc. The purpose of this event is to give the host or any attached arc a chance to cancel the change if they have reason to believe the change should not occur. The Cancel parameter is an output parameter whose default value is False. Setting the Cancel parameter to True will stop the move or resize from occurring.

OnNodeAdd(NodeId: Long)

This event is raised when a new node has been added to the surface. The ID of the newly added node is provided as a parameter. This ID may be passed to the GetProjectionObject method to retrieve the newly added node object.

OnNodeDelete(NodeId: Long)

This event is raised when a node has been removed from the surface and released. The ID of the released node is provided as a parameter. This ID may not be passed to the GetProjectionObject method to retrieve the deleted node object, because it is already gone.

OnArcAdd(ArcId: Long)

This event is raised when a new arc has been added to the surface. The ID of the newly added arc is provided as a parameter. This ID may be passed to the GetProjectionObject method to retrieve the newly added arc object.

OnArcDelete(ArcId: Long)

This event is raised when an arc has been removed from the surface and released. The ID of the released arc is provided as a parameter. This ID may not be passed to the GetProjectionObject method to retrieve the deleted arc object, because it is already gone.

OrttachPointAdd (AttachPointId: Long)

This event is raised when a new attach point has been added to the surface. The ID of the newly added attach point is provided as a parameter. This ID may be passed to the GetAttachPointObject method to retrieve the newly added attach point object.

OnAttachPointDelete(AttachPointId: Long)

This event is raised when an attach point has been removed from the surface and released. The ID of the newly released attach point is provided as a parameter. This ID may not be passed to the GetAttachPointObject method to retrieve the released attach point object, because it is already gone.

OnVMEModeChange(OldMode: VMEModeEnum, NewMode: VMEModeEnum)

This event is raised when VMEMode property on the IVMESurface interface changes value. This allows the host to adapt to the new mode of the surface. VMEMode is described above.

OnDragEnter(DataObject: DataObject, KeyState: Long, X: Long, Y: Long, Effect: Long)

This event is raised when a standard OLE Drag/Drop DataObject is first dragged over the surface. The DataObject being dragged and the X and Y coordinates where it is currently being dragged at are provided as parameters. The KeyState parameter is a bit field describing whether the Ctrl key (bit field equals 0xx1b, or 1 decimal), Shift key (bit field equals 0x1xb, or 2 decimal), and/or Alt (bit field equals 01xxb, or 4 decimal) keys are being pressed while the drag is occurring. Its value is the sum (OR-ing) of the values for the keys being pressed, or zero (0) if no keys are being pressed. The Effect parameter is a return parameter indicating the visual feedback that should be provided to the user. An Effect value of zero (0) indicates that the DataObject cannot be dropped on the surface. An Effect value of one (1) indicates that the DataObject will be copied to the surface if dropped. Note that the OnDragOver event does not provide the DataObject as one of its parameters. Therefore, if future drag events need a reference to this object, this reference will need to be stored in response to this event.

OnDragOver(KeyState: Long, X: Long, Y: Long, Effect: Long)

This event is raised during each mouse move after the OnDragEnter event and before either the OnDragLeave event or the OnDrop event. The DataObject that is being dragged is not known unless a reference to it was stored in response to the OnDragEnter event. The X and Y coordinates where it is currently being dragged at are provided as parameters. The KeyState parameter is a bit field describing whether the Ctrl key (bit field equals 0xx1b, or 1 decimal), Shift key (bit field equals 0x1xb, or 2 decimal), and/or Alt (bit field equals 01xxb, or 4 decimal) keys are being pressed while the drag is occurring. Its value is the sum (OR-ing) of the values for the keys being pressed, or zero (0) if no keys are being pressed. The Effect parameter is a return parameter indicating the visual feedback that should be provided to the user. An Effect value of zero (0) indicates that the DataObject can not be dropped on the surface. An Effect value of one (1) indicates that the DataObject will be copied to the surface if dropped. The primary purpose of this event is to allow the host to change the effect in response to the new X and Y coordinates or a change in the KeyState.

OnDragLeave( )

This event is raised if an object is dragged off the surface after an OnDragEnter event if an OnDrop event never occurred. This allows the host to clear its reference to the DataObject that it may have set in the OnDragEnter event.

OnDrop(DataObject: DataObject, KeyState: Long, X: Long, Y: Long, Effect: Long)

This event is raised when a DataObject being dragged on the surface is dropped on the surface (e.g., the left mouse button is released). The DataObject that was dropped, and the X and Y coordinates where it was dropped, are provided as parameters. The KeyState parameter is a bit field describing whether the Ctrl key (bit field equals 0xx1b, or 1 decimal), Shift key (bit field equals 0x1xb, or 2 decimal), and/or Alt (bit field equals 01xxb, or 4 decimal) keys are being pressed while the drag is occurring. Its value is the sum (OR-ing) of the values for the keys being pressed, or zero (0) if no keys are being pressed. The Effect parameter is a return parameter indicating whether the drop was accepted (1) or rejected (0).

OnZoomPercentChange(ZoomPercent: Long)

This event is raised whenever the ZoomPercent property on the IVMESurface interface changes value.

OnVMEReadyStateChange(ReadyState: VMEReadyStateEnum)

This event is raised whenever the ready state of the surface changes. The new ready state value is provided in the ReadyState parameter. The ready states are Complete, Interactive, Loaded, Loading, and Uninitialized. The following table shows each of the states in the order they occur and what they mean. These states are simply passed through from the rendering engine and therefore they correspond exactly with the rendering engine states. Note that new projections should not be added to the surface through the MSVME interfaces until the Complete State.

| State | Meaning |
|---|---|
| Uninitialized | Start state |
| Loading | Given URL |
| Loaded | Page in local machine |
| Interactive | User can start clicking |
| Complete | Page totally done |

VMEEventInfo

At all times, there is only one relevant instance of this class. This VMEEventInfo object can be obtained via the EventInfo property on the IVMESurface interface. This object contains additional supplementary information about the most recent surface event. Specifically, it contains information about which keys were being held down on the keyboard while the event took place. The information provided by this object is kept on this separate object rather than being provided directly as a parameter to the event, because it is usually not relevant.

ShiftKey: Boolean

This property indicates whether the shift key was being held down during the last surface event.

ControlKey: Boolean

This property indicates whether the Ctrl key was being held down during the last surface event.

AltKey: Boolean

This property indicates whether the Alt key was being held down during the last surface event.

VMESurfaceUtilities

There are some non-VME specific objects that have been found to be useful when utilizing the VME interfaces. To simplify the task of developing VMS hosts, these objects have been provided through this class. There only needs to be one instance of this class. This object can be retrieved through the GetSurfaceUtilities method on the IVMESurface interface.

GetVariantCollection( ): Variant Collection

This method creates an empty collection of variants and returns it. This collection has the standard collection interface: add, remove, item, count, and enumeration. This method is particularly useful when programming in languages that do not readily provide collections.

GetNamedAttributeCollection( ): NamedAttribute Collection

This method creates an empty collection of VMENamedAttribute objects and returns it. This collection has the standard collection interface: add, remove, item, count, and enumeration. This method is particularly useful when programming in languages that do not readily provide collections.

GetPointCollection( ): VMEPoint Collection

This method creates an empty collection of points and returns it. This collection has the standard collection interface: add, remove, item, count, and enumeration. This method is particularly useful when programming in languages that do not readily provide collections.

VMENamedAttribute

A NamedAttribute object is simply a Name/Value pair. These are also sometimes referred to a dictionary entries or tagged values. Regardless of the name, their purpose is to store one piece of information (the value), along with a key (the name) to look up that value. Named attributes are almost always placed in collections that collectively act as a dictionary.

Name: String

This property stores the key to use to find the value.

Value: String

This property stores the information found when using the Name as a key.

VMEDataObject

The OLE Drag/Drop standard defines a standard IDataObject interface. However, script languages and languages like VB can not use this because it does not support a dispatch interface. This class provides as single data object supporting the standard IDataObject interface and the VMEDataObject interface for dispatch clients. The DataObject is a container for data being transferred from a component source to a component target. The data is stored in the format defined by the component source.

GetData(Format: Long, Data: Variant)

This method functions the same as the method with the same name on the standard OLE Drag/Drop interface IDataObject. The Format parameter indicates the format expected by the component target. The values for the Format parameter are shown in the table below. This method returns data from a DataObject in the form of a variant in the Data parameter.

It is possible for the GetData and SetData methods to use data formats other than those listed in the table below, including user-defined formats registered with Windows via the RegisterClipboardFormat( ) API function. The GetData method returns data in a byte array when it is in a format that it does not recognize, although many languages like Visual Basic can transparently convert this returned byte array into other data types, such as strings.

| Constant | Value | Description |
|---|---|---|
| VbCFText | 1 | Text (.txt files) |
| VbCFBitmap | 2 | Bitmap (.bmp files) |
| VbCFMetafile | 3 | metafile (.wmf files) |
| VbCFEMetafile | 14 | Enhanced metafile (.emf files) |
| TbCFDIB | 8 | Device-independent bitmap (DIB) |
| VbCFPalette | 9 | Color palette |
| VbCFFiles | 15 | List of files |
| VbCFRTF | −16639 | Rich text format (.rtf files) |

GetFormat(Format: Long): Boolean

This method functions exactly the same as the method with the same name on the standard OLE Drag/Drop interface IDataObject. This method returns a boolean value indicating whether an item in the DataObject matches the specified format. The values for the Format parameter are shown in the table above.

VMENode

This interface defines all shared properties, methods, and events for nodes and; therefore, must be implemented by all node components. The primary purpose of this interface is to facilitate the active interaction between the nodes and the host, surface, and other projections on the surface. The VMENodeSite interface documented below facilitates passive communication from the nodes.

Id: Long

This read-only property contains the automatically generated identity of the node as discussed above.

Selected: Boolean

This property indicates whether the node is part of the current selection. The surface sets this property just prior to the OnNodeSelectionChange event being raised on the IVMESurfaceEvents interface. Only the surface should set this property. The node should only set this property indirectly by raising the OnNodeSelectionChange event on the VMENodeSite interface.

Visible: Boolean

This property indicates whether the node is visible or not. The surface sets this property just prior to the OnNodeVisibilityChange event being raised on the IVMESurfaceEvents interface. Only the surface should set this property. The node should only set this property indirectly by raising the OnNodeVisibilityChange event on the VMENodeSite interface.

Initialize(Surface: VMESurface, NodeSite: VMENodeSite)

This method does the initial setup of the node before use. This method is called automatically by the surface when the node is added to the surface. The surface passes a pointer to itself, as well as, the node site to which the node should post messages. The node, in the implementation of this method, should keep references to both the surface and node site for future use.

Note that the node is guaranteed to be on the surface when this method is called. However, for many hosts, the node has not yet been placed at any significant location. These hosts should call the InitializationComplete method once the node has been relocated to its initial coordinates.

InitializationComplete( )

This method provides a standard means for the host to communicate to a node that it is completely placed on the surface. The initialize method is called automatically by the surface when the node is first added but this method must be called explicitly by the host. Typically, this method is called just after the host has set the coordinates of the new node and just before the node is made visible.

Uninitialize( )

This method should be called just before the node is released. This method releases resources held by the node.

OnHover(IsHover: Boolean)

This method is called automatically by the surface when the mouse moves onto the node or off of the node. The IsHover parameter will be True if the mouse just moved onto the node or false if it just moved off of the node. If the IsHover parameter is True then the node just became the HoverObject and it should highlight itself in some way to let the user know this. If the IsHover parameter is false then the object should unhighlight itself. Typically, hover objects highlight themselves by changing the thickness of their lines and/or changing their hue.

ZoomPercentChange(ZoomPercent: Long)

This method is called automatically by the surface when the ZoomPercent property on the IVMESurface interface is changed. The ZoomPercent parameter indicates the new zoom factor. The Node should alter its appearance to conform with this new ZoomPercent on its next redraw.

GetExtendedAttributes( ): NamedAttribute Collection

Extended attributes are name/value pairs (NamedAttrbributes) that can be arbitrarily added to any of the major objects in VME. They provide a general-purpose extensibility mechanism for adding new properties to an object at run time. This provides a convenient way for VMS hosts to temporarily store session specific parameters and/or persist host specific properties. On this interface, this method returns a read/write collection of NamedAttributes for this node.

GetNotationObject( ): Object

The method returns the notation object for the node. A notation object may be used to encapsulate the notational semantics and/or graphical behavior of a node separate from its control. Notation objects are uncommon but if they exist then they are accessed through this method.

GetSemanticObject( ): Object

This method returns the semantic object for the node. A semantic object is used to encapsulate the semantics of the object represented by the node from the notational semantics and/or graphical behavior of the node.

GetRenderingMarkupText( ): String

This method returns the VML/XML text that graphically and semantically describes the node. This method may be called directly by the host but is also called automatically by the surface on every projection when the SaveRendering method on the IVMESurface interface is called. VML describes the graphical rendering of the node for the rendering engine surface and is documented in the Internet Explorer documentation. XML describes the semantics of the object the node is projecting. This XML should comply with the dialect published by the Metadata Coalition for metadata exchange.

VMENodeSite

The node site is a class that only has one instance per surface. This node site object is supplied to every node in the Initialize method on the VMENode interface. The node site provides a means for the node to raise events to inform the surface and indirectly inform the host and other projections of important changes it has detected or instigated.

QueryNodeMoveResize(NodeId: Long, X: Long, Y: Long, Width: Long, Height: Long, Cancel: Boolean)

The node raises this event to inform the surface that it is about to move or change size. The surface, in turn, raises the event with the same name on the IVMESurfaceEvents interface and invokes one of the QueryMoveResizeEndProjection methods on the VMEArc interface of each arc attached to the specified node. The NodeId of the node that is about to move or change size and the new X and Y coordinates and Width and Height of the bounding rectangle it will have are provided as parameters. The purpose of this event is to give the host or any attached arc a chance to cancel the change if it has reason to believe the change should not occur. The Cancel parameter is an output parameter whose default value is False. Setting the Cancel parameter to True will stop the move or resize from occurring.

OnNodeMove(NodeId: Long, X: Long, Y: Long, Width: Long, Height: Long)

The node raises this event to inform the surface that it is has moved. The surface, in turn, raises the event with the same name on the IVMESurfaceEvents interface. The NodeId of the node that moved and the new X and Y coordinates of its bounding rectangle are provided as parameters. The Width and Height of the node's bounding rectangle, which should not have changed, are provided only for convenience. Note that the node needs to raise this event when it moves to inform the surface.

OnNodeResize(NodeId: Long, X: Long, Y: Long, Width: Long, Height: Long)

The node raises this event to inform the surface that it is has resized. The surface, in turn, raises the event with the same name on the IVMESurfaceEvents interface. The NodeId of the node that changed size and the new Width and Height of its bounding rectangle are provided as parameters. The X and Y coordinates of the node's bounding rectangle, which should not have changed, are provided only for convenience. Note that the node needs to raise this event when it resizes to inform the surface.

OnNodeSelectionChange(NodeId: Long, IsSelected: Boolean, UnselectOthers: Boolean)

The node raises this event to inform the surface that its selection has changed. The surface, in turn, raises the event with the same name on the IVMESurfaceEvents interface. The ID of the node and a flag indicting whether the node is now selected or unselected are provided as parameters. The node may set the UnselectOthers parameter to True to inform the surface that any projection currently in the selection should be unselected. If the UnselectOthers parameter is set to False then the other projections in the selection will be left unchanged.

OnNodeVisibilityChange(NodeId: Long, IsVisible: Boolean)

The node raises this event to inform the surface that its visibility has changed. The surface, in turn, raises the event with the same name on the IVMESurfaceEvents interface. The ID of the node and a flag indicting whether the node is now visible or invisible are provided as parameters.

OnNodeLeftClick(NodeId: Long, X: Long, Y: Long)

The node raises this event to inform the surface that the user has clicked on it. The surface, in turn, raises the event with the same name on the IVMESurfaceEvents interface. The ID of the node that was clicked on and the X and Y coordinates where the click occurred are provided as parameters.

OnNodeRightClick(NodeId: Long, X: Long, Y: Long)

The node raises this event to inform the surface that the user has right clicked on it. The surface, in turn, raises the event with the same name on the IVMESurfaceEvents interface. The ID of the node that was right clicked on and the X and Y coordinates where the click occurred are provided as parameters.

OnNodeDoubleClick(NodeId: Long, X: Long, Y: Long)

The node raises this event to inform the surface that the user has double clicked on it. The surface, in turn, raises the event with the same name on the IVMESurfaceEvents interface. The ID of the node that was double clicked on and the X and Y coordinates where the click occurred are provided as parameters.

QueryMoveAttachPoint(AttachPointId: Long, X: Long, Y: Long, Cancel: Boolean)

The node raises this event when it needs to move an attach point. This is usually because at least one border of the node is about to move. The ID of the attach point that needs to move and the X and Y coordinates of the new location where it is about to move to are provides as parameters. The surface responds to this event by invoking the QueryMoveAttachPoint method on the VMEArc interface of the effected arc. If the surface, the arc, or any other consumer of event sets the Cancel property to True then the node may not move the attach point. This may, in turn, trigger a cancellation of the node move or resize operation.

OnAttachPointMove(AttachPointId: Long, X: Long, Y: Long)

The node raises this event after it has received permission to move the attach point via the QueryMoveAttachPoint to actually move the attach point. The ID of the attach point that needs to move and the X and Y coordinates of its new location are provides as parameters. The surface responds to this event by invoking the OnAttachPointMove method on the VMEArc interface of the effected arc VMEArc This interface defines shared properties, methods, and events for arcs, and therefore is implemented by arc components. The primary purpose of this interface is to facilitate the active interaction between the arcs and the host, surface, and other projections on the surface. The VMEArcSite interface documented below facilitates passive communication from the arcs.

Id: Long

This read-only property contains the automatically generated identity of the arc as discussed above.

Selected: Boolean

This property indicates whether the arc is part of the current selection. The surface sets this property just prior to the OnArcSelectionChange event being raised on the IVMESurfaceEvents interface. Only the surface should set this property. The arc should only set this property indirectly by raising the OnArcSelectionChange event on the VMEArcSite interface.

Visible: Boolean

This property indicates whether the arc is visible or not. The surface sets this property just prior to the OnArcVisibilityChange event being raised on the IVMESurfaceEvents interface. Only the surface should set this property. The node should only set this property indirectly by raising the OnArcVisibilityChange event on the VMEArcSite interface.

EndProjection1: ProjectionId

This property contains the ID of the projection attached to the beginning of the arc. This property is not set by the surface so the arc must set it once this projection is known. The projection object with this identity may be retrieved using the GetProjectionObject method on the IVMESurface interface.

EndProjection2: ProjectionId

This property contains the ID of the projection attached to the end of the arc. This property is not set by the surface so the arc must set it once this projection is known. The projection object with this identity may be retrieved using the GetProjectionObject method on the IVMESurface interface.

Initialize(Surface: VMESurface, NodeSite: VMENodeSite)

This method does the initial setup of the arc before use. This method is called automatically by the surface when the arc is added to the surface. The surface passes a pointer to itself, as well as, the arc site to which the arc should post messages. The arc, in the implementation of this method, should keep references to both the surface and arc site for future use.

Note that the arc is guaranteed to be on the surface when this method is called. However, for many hosts, the arc has not yet been placed at any significant location. These hosts should call the InitializationComplete method once the first coordinate of the arc has been located to its initial coordinates.

InitializationComplete( )

This method provides a standard means for the host to communicate to an arc that it is completely placed on the surface. The initialize method is called automatically by the surface when the arc is first added but this method must be called explicitly by the host. Typically, this method is called just after the host has set the coordinates of the first point of the new arc and just before the arc is made visible.

Uninitialize( )

This method should be called just before the arc is released. This method releases resources held by the arc.

OnHover(IsHover: Boolean)

This method is called automatically by the surface when the mouse moves onto the arc or off of the arc. The IsHover parameter will be True if the mouse just moved onto the arc or false if it just moved off of the arc. If the IsHover parameter is True then the arc just became the HoverObject and it should highlight itself in some way to let the user know this. If the IsHover parameter is false then the arc should unhighlight itself. Typically, hover objects highlight themselves by changing the thickness of their lines and/or changing their hue.

QueryMoveResizeEndProjection1(X: Long, Y: Long, Width: Long, Height: Long, Cancel: Boolean)

This method is called automatically by the surface when the projection attached to the beginning of the arc is about to move or change size. The ID of this projection is stored in the EndProjection1 property. The new X and Y coordinates and Width and Height of the bounding rectangle it will have are provided as parameters. The purpose of this event is to give the arc a chance to cancel the change if it has reason to believe the change should not occur. The Cancel parameter is an output parameter whose default value is False. Setting the Cancel parameter to True will stop the move or resize from occurring. Note that the arc will be queried separately about the fact that one of its attach points is going to move with the QueryMoveAttachPoint method on this same interface.

QueryMoveResizeEndProjection2(X: Long, Y: Long, Width: Long, Height: Long, Cancel: Boolean)

This method is called automatically by the surface when the projection attached to the end of the arc is about to move or change size. The ID of this projection is stored in the EndProjection2 property. The new X and Y coordinates and Width and Height of the bounding rectangle it will have are provided as parameters. The purpose of this event is to give the arc a chance to cancel the change if it has reason to believe the change should not occur. The Cancel parameter is an output parameter whose default value is False. Setting the Cancel parameter to True will stop the move or resize from occurring. Note that the arc will be queried separately about the fact that one of its attach points is going to move with the QueryMoveAttachPoint method on this same interface.

OnMoveResizeEndProjection1(X: Long, Y: Long, Width: Long, Height: Long)

This method is called automatically by the surface when the projection attached to the beginning of the arc has moved or changed size. The ID of this projection is stored in the EndProjection1 property. The new X and Y coordinates and Width and Height of the bounding rectangle the projection has are provided as parameters. Note that the arc will be informed separately about the fact that one of its attach points has moved with the OnMoveAttachPoint method on this same interface.

OnMoveResizeEndProjection2(X: Long, Y: Long, Width: Long, Height: Long)

This method is called automatically by the surface when the projection attached to the end of the arc has moved or changed size. The ID of this projection is stored in the EndProjection2 property. The new X and Y coordinates and Width and Height of the bounding rectangle the projection has are provided as parameters. Note that the arc will be informed separately about the fact that one of its attach points has moved with the OnMoveAttachPoint method on this same interface.

InitiateAttach(ProjectionId: Long, X: Long, Y: Long)

The attachee calls this method after a successful attach negotiation to commit the attachment. The ProjectionId of the attachee and the X and Y coordinates of the attach point are provided as parameters. The actual attachee object can be obtained with this ProjectionId using the GetProjectionObject method on the IVMESurface interface. The arc this method was called on is the attacher.

QueryAttacher(ProjectionId: Long): Boolean

The attachee calls this method to inquire whether the attacher will attach to it. The ProjectionId of the attachee is provided as a parameter. The actual attachee object can be obtained with this ProjectionId using the GetProjectionObject method on the IVMESurface interface. The arc this method was called on is the attacher. This method will return True if the attacher accepts the attachment and false if the attacher rejects the attachment.

QueryMoveAttachPoint(AttachPointId: Long, X: Long, Y: Long, Cancel: Boolean)

Attach points are owned by the attacher arc. If the attacher arc wants to move an attach point it simply negotiates a new attach point with the attachee and moves it. However, if anyone else wants to move an attach point they must first ask permission to do so to the attacher arc. This method is called on the attacher arc to ask permission to move an attach point. The AttachPointId of the existing attach point and the X and Y coordinates of the new location are provided as parameters. The actual attach point object can be obtained by calling the GetAttachPointObject method on the IVMESurface interface. The Cancel parameter is a return parameter. If the Cancel parameter is set to True then the attacher rejects the move. If the Cancel parameter is set to False then the attacher accepts the move.

OnMoveAttachPoint(AttachPointId: Long, X: Long, Y: Long)

This method is invoked automatically by the surface on the attacher arc to inform the arc that one of its attach points has moved. The AttachPointId of the attach point that move and the X and Y coordinates of its new location are provided as parameters.

ZoomPercentChange(ZoomPercent: Long)

This method is called automatically by the surface when the ZoomPercent property on the IVMESurface interface is changed. The ZoomPercent parameter indicates the new zoom factor. The arc should alter its appearance to conform to this new ZoomPercent on its next redraw.

GetWayPoints( ): VMEPoint Collection

Way points are all significant points on a multi-line-segment arc, not including the end points (first and last points) of that arc. Basically, they are all points where the arc bends. This method returns an ordered collection of VMEPoints containing all of the way points. The arc should reflect modifying the points in this collection.

GetExtendedAttributes( ): NamedAttribute Collection

Extended attributes are name/value pairs (NamedAttrbributes) that can be arbitrarily added to any of the major objects in VME. They provide a general-purpose extensibility mechanism for adding new properties to an object at run time. This provides a convenient way for VMS hosts to temporarily store session specific parameters and/or persist host specific properties. On this interface, this method returns a read/write collection of NamedAttributes for this arc.

GetNotationObject( ): Object

The method returns the notation object for the arc. A notation object may be used to encapsulate the notational semantics and/or graphical behavior of the arc separate from its control. Notation objects are accessed through this method.

GetSemanticObject( ): Object

This method returns the semantic object for the arc. A semantic object is used to encapsulate the semantics of the object represented by the arc from the notational semantics and/or graphical behavior of the arc.

GetRenderingMarkupText( ): String

This method returns the VML/XML text that graphically and semantically describes the arc. This method may be called directly by the host but is also called automatically by the surface on every projection when the SaveRendering method on the IVMESurface interface is called. VML describes the graphical rendering of the arc for the rendering engine surface and is documented in the Internet Explorer documentation. XML describes the semantics of the object the arc is projecting. This XML should comply with the dialect published by the Metadata Coalition for metadata exchange.

VMEArcSite

The arc site is a class that only has one instance per surface. This arc site object is supplied to every arc in the Initialize method on the VMEArc interface. The arc site provides a means for the arc to raise events to inform the surface and indirectly inform the host and other projections of important changes it has detected or instigated.

QueryAraMoveResize(ArcId: Long, X: Long, Y: Long, Width: Long, Height: Long, Cancel: Boolean)

The arc raises this event to inform the surface that it is about to move or change size. The surface, in turn, raises the event with the same name on the IVMESurfaceEvents interface and invokes one of the QueryMoveResizeEnd-Projection methods on the VMEArc interface of each arc attached to the specified arc. The ArcId of the arc that is about to move or change size and the new X and Y coordinates and Width and Height of the bounding rectangle it will have are provided as parameters. The purpose of this event is to give the host or any attached arc a chance to cancel the change if it has reason to believe the change should not occur. The Cancel parameter is an output parameter whose default value is False. Setting the Cancel parameter to True will stop the move or resize from occurring.

OnArcMove(ArcId: Long, X: Long, Y: Long, Width: Long, Height: Long)

The arc raises this event to inform the surface that it is has moved. The surface, in turn, raises the event with the same name on the IVMESurfaceEvents interface. The ArcId of the arc that moved and the new X and Y coordinates of its bounding rectangle are provided as parameters. The Width and Height of the arc's bounding rectangle, which should not have changed, are provided only for convenience. Note: the arc MUST raise this event when it moves to inform the surface.

OnArcResize(ArcId: Long, X: Long, Y: Long, Width: Long, Height: Long)

The arc raises this event to inform the surface that it is has resized. The surface, in turn, raises the event with the same name on the IVMESurfaceEvents interface. The ArcId of the arc that changed size and the new Width and Height of its bounding rectangle are provided as parameters. The X and Y coordinates of the arc's bounding rectangle, which should not have changed, are provided only for convenience. Note that the arc is required to raise this event when it resizes, to inform the surface.

OnArcSelectionChange(ArcId: Long, IsSelected: Boolean, UnselectOthers: Boolean)

The arc raises this event to inform the surface that its selection has changed. The surface, in turn, raises the event with the same name on the IVMESurfaceEvents interface. The ID of the arc and a flag indicting whether the arc is now selected or unselected are provided as parameters. The arc may set the UnselectOthers parameter to True to inform the surface that any projection currently in the selection should be unselected. If the UnselectOthers parameter is set to False, then the other projections in the selection will be left unchanged.

OnArcVisibilityChange(ArcId: Long, IsVisible: Boolean)

The arc raises this event to inform the surface that its visibility has changed. The surface, in turn, raises the event with the same name on the IVMESurfaceEvents interface. The ID of the arc and a flag indicting whether the arc is now visible or invisible are provided as parameters.

OnArcLeftClick(ArcId: Long, X: Long, Y: Long)

The arc raises this event to inform the surface that the user has clicked on it. The surface, in turn, raises the event with the same name on the IVMESurfaceEvents interface. The ID of the arc that was clicked on, and the X and Y coordinates where the click occurred, are provided as parameters.

OnArcRightClick(ArcId: Long, X: Long, Y: Long)

The arc raises this event to inform the surface that the user has right-clicked on it. The surface, in turn, raises the event with the same name on the IVMESurfaceEvents interface. The ID of the arc that was right-clicked on, and the X and Y coordinates where the click occurred, are provided as parameters.

OnArcDoubleClick(ArcId: Long, X: Long, Y: Long)

The arc raises this event to inform the surface that the user has double-clicked on it. The surface, in turn, raises the event with the same name on the IVMESurfaceEvents interface. The ID of the arc that was double-clicked on, and the X and Y coordinates where the click occurred, are provided as parameters.

QueryMoveAttachPoint(AttachPointId: Long, X: Long, Y: Long, Cancel: Boolean)

The arc raises this event when it needs to move an attach point. Notice that it does not need to raise this event to move the two attach points it owns, only the attach points of those arcs that are attached to it. This is usually because at least one line segment of the arc is about to move. The ID of the attach point that needs to move, and the X and Y coordinates of the new location to where it is about to move are provided as parameters. The surface responds to this event by invoking the QueryMoveAttachPoint method on the VMEArc interface of the effected arc. If the surface, the arc, or any other consumer of event sets the Cancel property to True, then the node may not move the attach point. This may, in turn, trigger a cancellation of the node move or resize operation.

OnAttachPointMove(AttachPointId: Long, X: Long, Y: Long)

The arc raises this event after it has received permission to move the attach point via the QueryMoveAttachPoint to actually move the attach point. The ID of the attach point that needs to move and the X and Y coordinates of its new location are provides as parameters. The surface responds to this event by invoking the OnAttachPointMove method on the VMEArc interface of the effected arc VMEPoint This interface provides a simple definition of a two-dimensional point. Clients may implement their own point collection and point class supporting this interface for a specific type of point. This allows the point to be recognized by generic point-aware algorithms, yet still behave properly for their specific context. For example, way points could automatically change the arc as the user changes the points.

Alternatively, a client may utilize the generic PointCollection class provided by the GetPointCollection method on the VMESurfaceUtilities interface and the generic VMEPoint class. In this approach, the entire points collection would have to be submitted to the arc at once, and the arc would draw itself accordingly. VMEArc does not have a method for doing this, and thus it would have to be implemented on the interface specific to that arc.

X: Long

This read/write property contains the X coordinate of the point.

Y: Long

This read/write property contains the Y coordinate of the point.

VMEProjectionCoordinates

The bounding rectangle coordinates and z-order of the projections are kept on a separate object from the projection controls themselves because these coordinates are primarily managed by the surface. This object can always be retrieved for a given projection using the GetProjectionCoordinates method on the IVMESurface interface. These coordinates are expressed in the document coordinate system.

ProjectionId: Long

This read-only property contains the automatically-generated identity of the projection, as discussed above. The projection with this identity can be retrieved using the GetProjectionObject method on the IVMESurface interface.

X: Long

This read-only property contains the X coordinate of the projection. This coordinate may only be changed by raising the OnNodeMove event on VMENodeSite or the OnArcMove event on the VMEArcSite of the projection identified by the ProjectionId property.

Y: Long

This read-only property contains the Y coordinate of the projection. This coordinate may only be changed by raising the OnNodeMove event on VMENodeSite or the OnArcMove event on the VMEArcSite of the projection identified by the ProjectionId property.

Z: Long

This read-only property contains the Z order of the projection. Objects with high Z order values will automatically appear on top of objects with lower Z order values that occupy the same two-dimensional space (overlap in the X and Y). Also, objects higher in the Z order will be hit easier than object lower in the Z order, as described above with respect to hit testing.

Width: Long

This read-only property contains the width of the projection. This coordinate may only be changed by raising the OnNodeResize event on VMENodeSite or the OnArcResize event on the VMEArcSite of the projection identified by the ProjectionId property.

Height: Long

This read-only property contains the height of the projection. This coordinate may only be changed by raising the OnNodeResize event on VMENodeSite or the OnArcResize event on the VMEArcSite of the projection identified by the ProjectionId property.

VMEAttachPoint

An attach point is simply the point where an arc (attacher) is connected to a projection (attachee). The following defines the properties, methods, and events of the attach point class.

AttacheeId: Long

This read-only property contains the ID of the projection that is being attached to at the attach point. An attachee may be either a node or an arc. The actual projection object may be retrieve with this ID using the GetProjectionObject method on the IVMESurface interface.

AttacherId: Long

This read-only property contains the ID of the arc that is attaching at the attach point. The actual arc object may be retrieve with this ID using the GetProjectionObject method on the IVMESurface interface.

X: Long

This read-only property contains the X coordinate of the attach point. This coordinate may only be changed by raising the OnAttachPointMove event on the either the attachees or attachers VMENodeSite or VMEArcSite.

Y: Long

This read-only property contains the Y coordinate of the attach point. This coordinate may only be changed by raising the OnAttachPointMove event on the either the attachees or attachers VMENodeSite or VMEArcSite.

VMEAttachNegotiation

This is a secondary interface that appears on all arcs and nodes that can have arcs attach to them. In this context, such projections are referred to as "Attachees" and the arc that is attaching to them is referred to as the "Attacher".

The process of establishing an attachment between one end of an arc and another projection is involved, and is described in the aforementioned United States Patent Application entitled "Negotiated Interconnection of Visual Modeling Elements." The process is designed so that it may be investigated and subsequently instigated by either party. The party that is investigating an attachment should first determine that it is interested in attaching to the other party. For example, some arcs may only be used to attach certain types of nodes. If the node it is investigating is not one of these types then there is no reason to continue with the negotiation. If the investigating party is interested in continuing the negotiation then it determines if the investigated party is interested in attaching to it.

If the investigating party is the attachee then it should call the QueryAttacher method on the attacher's VMEArc interface. If the return value is true then the attachee should determine an appropriate attach point location and then invoke the InitiateAttach method of the attacher's VMEArc interface. This method will create the attach point and inform the surface of the end attachment.

If the investigating party is the attacher then it should begin by determining if the attachee supports the VMEAttachNegotiation interface. If it does not then the attacher may not attach to this attachee and the negotiation is complete. If the attachee does support the VMEAttachNegotiation then the attacher should determine the appropriate attach point location by invoking GetNearestAttachPointX and GetNearestAttachPointY methods on the Attachee's VMEAttachNegotiation interface. The attacher should then call the QueryAttachee method on the Attachee's VMEAttachNegotiation interface. If the Cancel parameter is false then the attachee has accepted the attachment. If the attacher has an adornment (symbol at the end of the arc) then they may also need to invoke the GetNearestAttachPointAngle to determine which direction this adornment should face. Finally, the attacher should initiate the attachment by creating the attach point on the surface. Notice that no matter which party began the negotiation, the attacher arc is ultimately responsible for initiating the attachment. This is because the arc actually owns the attach points.

QueryAttacher(ProjectionId: Long): Boolean

The attachee calls this method to inquire whether the attacher will attach to it. The ProjectionId of the attachee is provided as a parameter. The actual attachee object can be obtained with this ProjectionId using the GetProjectionObject method on the IVMESurface interface. The arc this method was called on is the attacher. This method will return True if the attacher accepts the attachment and false if the attacher rejects the attachment.

QueryAttachee(ArcId: Long, X: Long, Y: Long, Cancel: Boolean)

This method is called by the attacher to request an attachment to the attachee. The ArcId parameter identifies the attacher and the X and Y parameters specify the point of attachment. The actual attacher Arc object may be retrieved using a GetProjectionObject method on the IVMESurface interface. The Cancel parameter is a return parameter. The attachee sets the Cancel parameter to True to reject the attachment and the attach operation will be canceled. The attachee should set the Cancel parameter to False to accept the attachment. The attacher is then responsible for actually initiating the attachment.

InitiateAttach(ProjectionId: Long, X: Long, Y: Long)

The attachee calls this method after a successful attach negotiation to commit the attachment. The ProjectionId of the attachee and the X and Y coordinates of the attach point are provided as parameters. The actual attachee object can be obtained with this ProjectionId using the GetProjectionObject method on the IVMESurface interface. The arc this method was called on is the attacher.

GetNearestAttachPointX(ArcId: Long, X: Long, Y: Long, NearestX: Long)

This method is called by the attacher to request the X coordinate of the closest attach point to the point specified by the X and Y parameters. This method should not be called until the attacher has already determined that the attachment is acceptable to the attachee by calling the QueryAttachee method. The ArcId parameter identifies the attacher. The X coordinate of the best attach point is returned as the NearestX parameter.

GetNearestAttachPointY(ArcId: Long, X: Long, Y: Long, NearestY: Long)

This method is called by the attacher to request the Y coordinate of the closest attach point to the point specified by the X and Y parameters. This method should not be called until the attacher has already determined that the attachment is acceptable to the attachee by calling the QueryAttachee method. The ArcId parameter identifies the attacher and the actual arc object may be retrieved using the GetProjectionObject method on the IVMESurface interface. The Y coordinate of the best attach point is returned as the NearestY parameter.

OnAttach(AttachPointId: Long)

This method is invoked automatically on the attachee's VMEAttachNegotiation interface by the surface when the attach point is added. Invoking this method makes the attachment officially complete. The attacher does not receive a similar message because the attacher always initiates the attachment and therefore is already aware. The AttachPointId parameter is the ID of the newly created attach point. The attach point object with this ID may be retrieved using the GetAttachPointObject method on the IVMESurface interface.

OnDetach (AttachPointId: Long)

This method is invoked automatically on the attachee's VMEAttachNegotiation interface by the surface when the attach point is removed. Invoking this method makes the attachment officially over. The attacher does not receive a similar message because the attacher always initiates the detachment and therefore is already aware. The AttachPointId parameter is the ID of the removed attach point. The attach point object cannot be retrieved via this ID using the GetAttachPointObject method on the IVMESurface interface because the attach point no longer exists.

As can be seen from the foregoing detailed description, dynamic, active surface and model elements have numerous advantages over static surfaces and elements.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising:
   providing a surface object having a model element object associated therewith;
   providing interfaces to the surface object and the model element object for accessing methods of the surface object and the model element object;
   detecting events at the surface object for viewing or editing the model element object via an interface of the model element object; and
   dynamically layering a plurality of model element objects relative to the surface object as a user interacts with the plurality of model element objects.

2. The method of claim 1 wherein providing the surface object includes providing a rendering engine.

3. The method of claim 2 wherein providing a surface object includes rendering an HTML document via the rendering engine.

4. The method of claim 2 wherein the surface object includes a visualization and modeling engine, and wherein the methods of the surface object are included in the rendering engine and the visualization and modeling engine.

5. The method of claim 1 further comprising associating the model element object with the surface object.

6. The method of claim 1 wherein detecting events at the surface object includes, receiving events generated via a pointing device.

7. The method of claim 1 wherein detecting events at the surface object includes, receiving an event related to a visibility change of the model element object.

8. The method of claim 7 further comprising changing the visibility of the model element object.

9. The method of claim 7 further comprising:
   detecting events at the surface object includes receiving an event related to a zoom percentage change.

10. The method of claim 9 further comprising changing a displayed size of the model element object.

11. The method of claim 10 wherein changing a displayed size of the model element object includes raising an event at the surface object and receiving the event at the model element object.

12. The method of claim 1 wherein detecting events at the surface object includes, receiving an event related to a selected or unselected state change of the model element object.

13. The method of claim 1 wherein detecting events at the surface object includes, receiving an event related to a resizing of the model element object.

14. The method of claim 1 further comprising associating another model element object with the surface object.

15. The method of claim 14 wherein associating the other model element object with the surface object includes receiving information corresponding to the other model element being placed upon a visual representation of the surface object.

16. A computer-readable medium having computer-executable instructions for performing the method of claim 1.

17. In a computer-based modeling environment, a system comprising:
   a surface including methods and having at least one interface to the methods of the surface; and
   a model element including methods and having at least one interface to the methods of the model element, wherein:
   the surface is configured to detect an event and to execute at least one of the methods of the surface based on the event to communicate information to the model element, and
   the model element is configured to detect the information and to execute at least one of the methods of the model element based on the information to perform a modeling-related action.

18. The system of claim 17 wherein the modeling-related action comprises raising another event.

19. The system of claim 17 wherein the modeling-related action corresponds to a state change of the model element.

20. The system of claim 19 wherein the state change of the model element corresponds to changing between hidden and visible states.

21. The system of claim 19 wherein the state change of the model element corresponds to changing between selected and unselected states.

22. The system of claim 19 wherein the state change of the model element corresponds to resizing the model element.

23. The system of claim 17 wherein the surface comprises a rendering engine having a set of interfaces.

24. The system of claim 23 wherein the rendering engine renders an HTML page as a background surface.

25. The system of claim 23 wherein the surface includes a modeling engine having another set of interfaces.

26. The system of claim 17 wherein the model element comprises a node object.

27. The system of claim 17 wherein the model element comprises an arc object.

28. A computer-readable-medium having computer executable instructions, comprising:
   initializing a surface having a surface interface;
   dynamically layering a plurality of model elements relative to the surface as a user interacts with the plurality of model elements, each of the plurality of model elements having a model element interface;
   receiving an event at the surface, the event corresponding to a request to perform an action with respect to at least one of the plurality of model elements; and
   performing the action by communicating from the surface object to the at least one of the plurality of model elements via one or more of the respective model element interfaces.

29. The computer-readable-medium of claim 28 wherein initializing the surface includes rendering a background surface.

30. The computer-readable-medium of claim 29 wherein the background surface comprises HTML.

31. The computer-readable-medium of claim 28 wherein initializing the surface includes accessing content via a URL.

32. The computer-readable-medium of claim 28 wherein the event received at the surface corresponds to a pointing device event.

33. The computer-readable-medium of claim 28 wherein the event received at the surface corresponds to a keyboard event.

34. The computer-readable-medium of claim 28 wherein the event received at the surface corresponds to a request to select the at least one of the plurality of model elements.

35. The computer-readable-medium of claim 28 wherein the event received at the surface corresponds to a request to reposition the at least one of the plurality of model elements with respect to the surface.

36. The computer-readable-medium of claim 28 wherein the event received at the surface corresponds to a request tp resize the at least one of the plurality of model elements.

37. The computer-readable-medium of claim 28 wherein the event received at the surface corresponds to a request to negotiate an interconnection to the at least one of the plurality of model elements.

38. The computer-readable-medium of claim 28 wherein the event received at the surface corresponds to a request to print a representation of the surface including an area having a representation of the at least one of the plurality of model elements therein.

39. The computer-readable-medium of claim 28 wherein the event received at the surface corresponds to a request to save surface data including model element data.

40. The computer-readable-meditim of claim 39 wherein the surface data is saved as an HTML document.

* * * * *